US012591984B2

(12) United States Patent
Ryu

(10) Patent No.: US 12,591,984 B2
(45) Date of Patent: Mar. 31, 2026

(54) SYSTEMS AND METHODS FOR TRAVERSING VIRTUAL SPACES

(71) Applicant: ADEIA GUIDES INC., San Jose, CA (US)

(72) Inventor: Eun-Seok Ryu, Seoul (KR)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/092,572

(22) Filed: Jan. 3, 2023

(65) Prior Publication Data

US 2024/0221187 A1     Jul. 4, 2024

(51) Int. Cl.
| | |
|---|---|
| *G06T 7/292* | (2017.01) |
| *G06F 3/01* | (2006.01) |
| *G06T 7/70* | (2017.01) |
| *H04L 47/25* | (2022.01) |
| *H04N 23/90* | (2023.01) |

(52) U.S. Cl.
CPC .............. *G06T 7/292* (2017.01); *G06F 3/011* (2013.01); *G06T 7/70* (2017.01); *H04L 47/25* (2013.01); *H04N 23/90* (2023.01); *G06T 2207/30196* (2013.01)

(58) Field of Classification Search
CPC . G06T 7/292; G06T 7/70; G06T 2207/30196; H04N 23/90; G06F 3/011; H04L 47/25
USPC ........................................................ 348/159
See application file for complete search history.

(56) References Cited

U.S. PATENT DOCUMENTS

| | | | | |
|---|---|---|---|---|
| 10,567,464 | B2 * | 2/2020 | Pang .................... | H04N 13/232 |
| 11,381,743 | B1 | 7/2022 | Mahbub et al. | |

| | | | | |
|---|---|---|---|---|
| 2007/0296815 | A1 * | 12/2007 | Isaksson .................. | H04N 7/18 |
| | | | | 348/157 |
| 2017/0243352 | A1 | 8/2017 | Kutliroff et al. | |
| 2018/0160156 | A1 * | 6/2018 | Hannuksela ....... | H04N 21/8456 |
| 2018/0278919 | A1 | 9/2018 | Lee et al. | |
| 2019/0052937 | A1 * | 2/2019 | Malamal Vadakital ..................... | |
| | | | | H04L 65/70 |
| 2019/0080575 | A1 * | 3/2019 | Lee .................. | G08B 13/19608 |
| 2019/0200096 | A1 * | 6/2019 | Katsumata ....... | H04N 21/26258 |
| 2019/0377894 | A1 * | 12/2019 | Jang .................... | G06F 21/6218 |
| 2019/0384414 | A1 * | 12/2019 | Woo ...................... | G06V 40/174 |
| 2020/0007845 | A1 * | 1/2020 | Fukuyasu .............. | H04N 13/15 |

(Continued)

OTHER PUBLICATIONS

I. JTC1/SC29/WG11, "Call for Proposals on 3DoF+ Visual." 125th MPEG meeting of ISO/IEC JTC1/SC29/ WG11, MPEG/n18145, 2019.

(Continued)

*Primary Examiner* — Matthew David Kim
(74) *Attorney, Agent, or Firm* — HG LAW LLP

(57) ABSTRACT

Systems and methods are provided for traversing virtual spaces. The system receives first and second image data of respective views of an environment simultaneously captured by a first and a second plurality of cameras associated with a first and a second space of the environment, respectively. The system detects, based on at least one of the first or the second image data, that a subject is located within the first space of the environment. In response to detecting that the subject is located within the first space of the environment: the system generates, for transmission at a first bitrate, a first bitstream based on at least a portion of the first image data; and the system generates, for transmission at a second bitrate lower than the first bitrate, a second bitstream based on at least a portion of the second image data.

20 Claims, 17 Drawing Sheets

700

(56) References Cited

U.S. PATENT DOCUMENTS

| | | | |
|---|---|---|---|
| 2020/0013273 A1* | 1/2020 | Souloglou | G06F 16/56 |
| 2020/0304949 A1* | 9/2020 | Mate | H04N 21/816 |
| 2021/0203837 A1 | 7/2021 | Otsubo et al. | |
| 2023/0026014 A1* | 1/2023 | Brandt | H04N 21/6587 |
| 2023/0205313 A1* | 6/2023 | Potetsianakis | G06F 3/015 |
| | | | 345/419 |
| 2023/0336865 A1 | 10/2023 | Da et al. | |
| 2024/0095997 A1 | 3/2024 | Viehauser | |
| 2024/0112414 A1* | 4/2024 | Wanbo | G06T 7/13 |
| 2024/0137419 A1* | 4/2024 | Paris | H04L 67/61 |
| 2024/0187673 A1* | 6/2024 | Ahsan | H04N 21/816 |
| 2024/0223731 A1 | 7/2024 | Ryu | |

OTHER PUBLICATIONS

Bonatto, Daniele, et al., "RaViS: Real-time accelerated View Synthesizer for immersive video 6DoF VR", Laboratory of Image Synthesis and Analysis, Universite Libre de Bruxelles; Brussels, Belgium, 2020.

Chen, Ying, et al., "Overview of the MVC + D 3D video coding standard", Journal of Visual Communication and Image Representation, vol. 25, No. 4, pp. 679-688, 2014.

Choi, B., et al., "Information technology-coded representation of immersive media (MPEG-I)—part 2: Omnidirectional media format", ISO/IEC, 2017.

Domanski, M., et al., "Technical description of proposal for Call for Proposals on 3DoF+ Visual prepared by Poznań University of Technology (PUT) and Electronics and Telecommunications Research Institute (ETRI)", 126th MPEG meeting of ISO/IEC JTC1/SC29/WG11, MPEG2019/m47407, Mar. 2019.

Fleureau, J., et al., "Description of Technicolor Intel response to MPEG-I 3DoF+ Call for Proposal", 126th MPEG meeting of ISO/IEC JTC1/SC29/WG11, MPEG2019/m47445, 2019.

Hannuksela, Miska M., et al., "Overview of the Multiview High Efficiency Video Coding (MV-HEVC) Standard", 2015 IEEE International Conference on Image Processing (ICIP), pp. 2154-2158, 2015.

Jeong, Jong-Beom, et al., "Rethinking Fatigue-Aware 6-DoF Video Streaming: Focusing on MPEG Immersive Video", International Conference on Information Networking 2022 (ICOIN2022), Jan. 12-15, 2022.

Jung, J., et al., "Common Test Conditions for MPEG Immersive Video", Standard ISO/IEC JTC1/SC29/WG4, MPEG/h0051, 2021.

Kroon, B., et al., "Philips response to CfP on 3DoF+", 126th MPEG meeting of ISO/IEC JTC1/SC29/WG11, MPEG2019/m47179, 2019.

Salahieh, B., et al., "Test Model 8 for MPEG Immersive Video", Standard ISO/IEC JTC1/SC29/WG4, MPEG/n0050, 2021.

Vadakital, V.K.M., et al., "Description of Nokia's response to CFP for 3DOF+ visual", 126th MPEG meeting of ISO/IEC JTC1/SC29/WG11, MPEG2017/m47372, 2019.

Wang, B., et al., "Description of Zhejiang University's response to 3DoF+ Visual CfP", 126th MPEG meeting of ISO/IEC JTC1/SC29/WG11, MPEG2019/m47684, 2019.

* cited by examiner

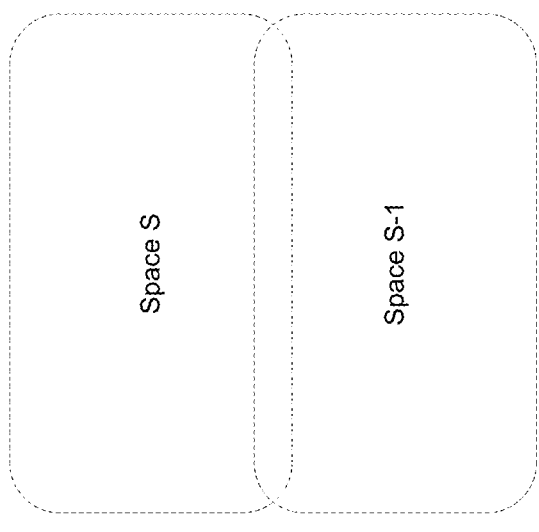
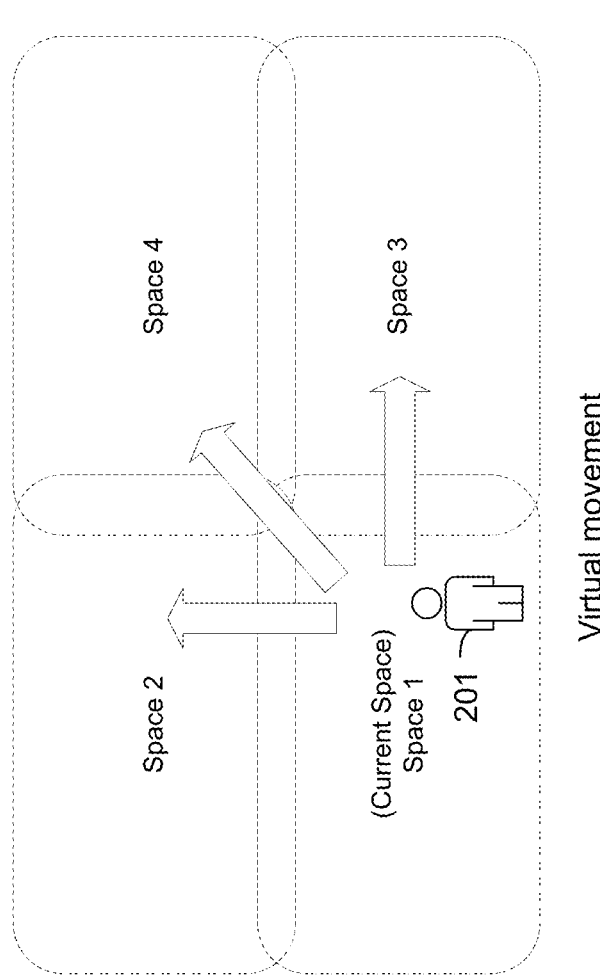
FIG. 2

Space 4

Space 3

Space 2

Space 1
(current space)

move

520

Sub-group cameras in
intermediate space

501

510

Selected cameras
for intermediate
space

● Basic views
○ Additional views

500

600

Selected cameras
for intermediate
space

Omni-directional
360-degree
cameras

Left cameras
(Space 1)

602
Sub-camera
group

620

Selected cameras
for intermediate
space 2D perspective
cameras

622
Sub-camera
group

801

815

818

814
818
810
812
808
806
804
802
816

814

User Input
Interface

Display

800

1000

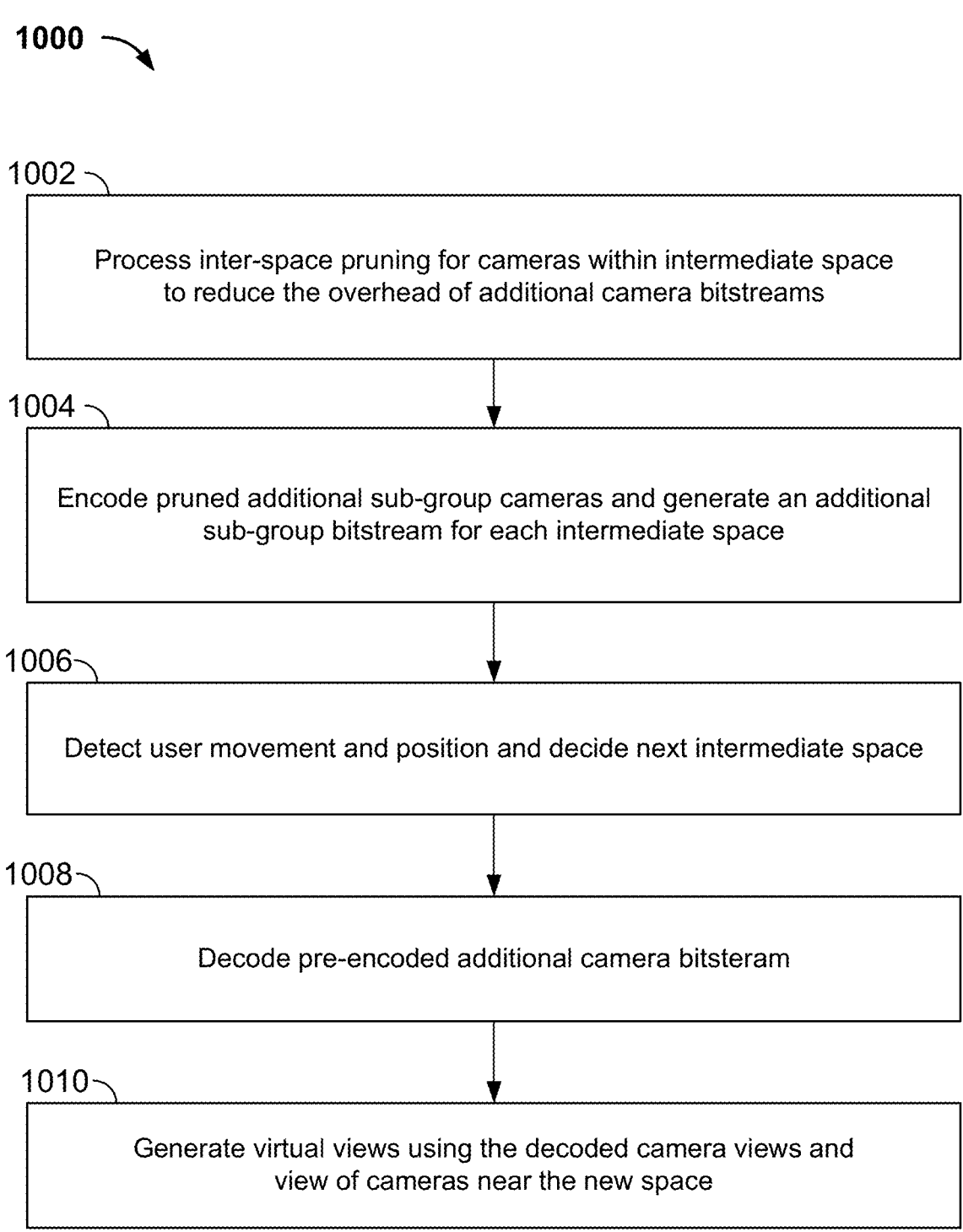

1002

Process inter-space pruning for cameras within intermediate space
to reduce the overhead of additional camera bitstreams

1004

Encode pruned additional sub-group cameras and generate an additional
sub-group bitstream for each intermediate space

1006

Detect user movement and position and decide next intermediate space

1008

Decode pre-encoded additional camera bitsteram

1010

Generate virtual views using the decoded camera views and
view of cameras near the new space

FIG. 10A

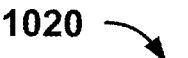
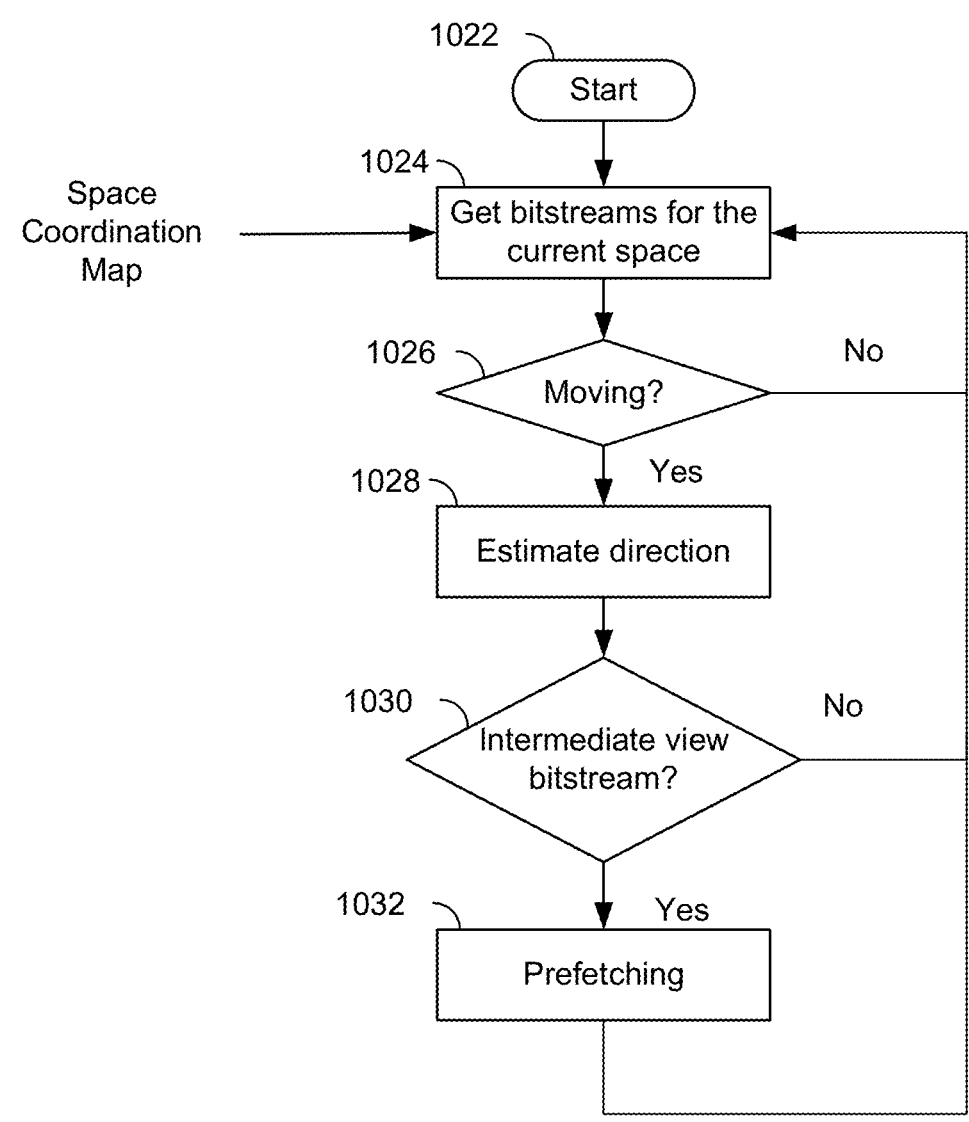
FIG. 10B

1100

Content Preparation

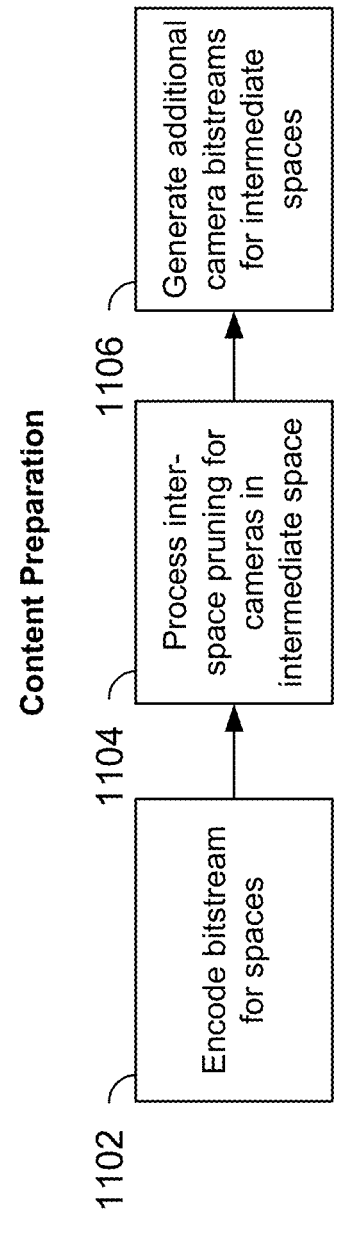

1102 — Encode bitstream for spaces

1104 — Process inter-space pruning for cameras in intermediate space

1106 — Generate additional camera bitstreams for intermediate spaces

Seamless Interspace Traversing

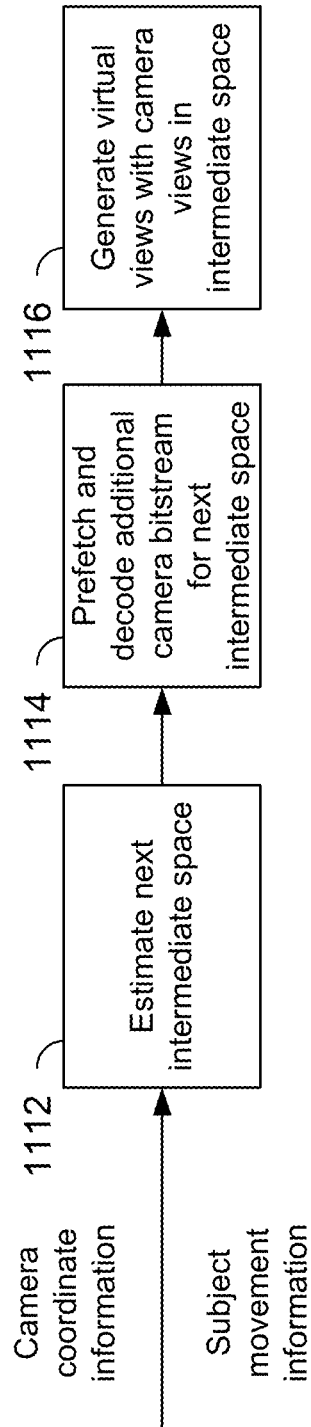

Camera coordinate information

Subject movement information

1112 — Estimate next intermediate space

1114 — Prefetch and decode additional camera bitstream for next intermediate space 1116 — Generate virtual views with camera views in intermediate space

Figure 13:
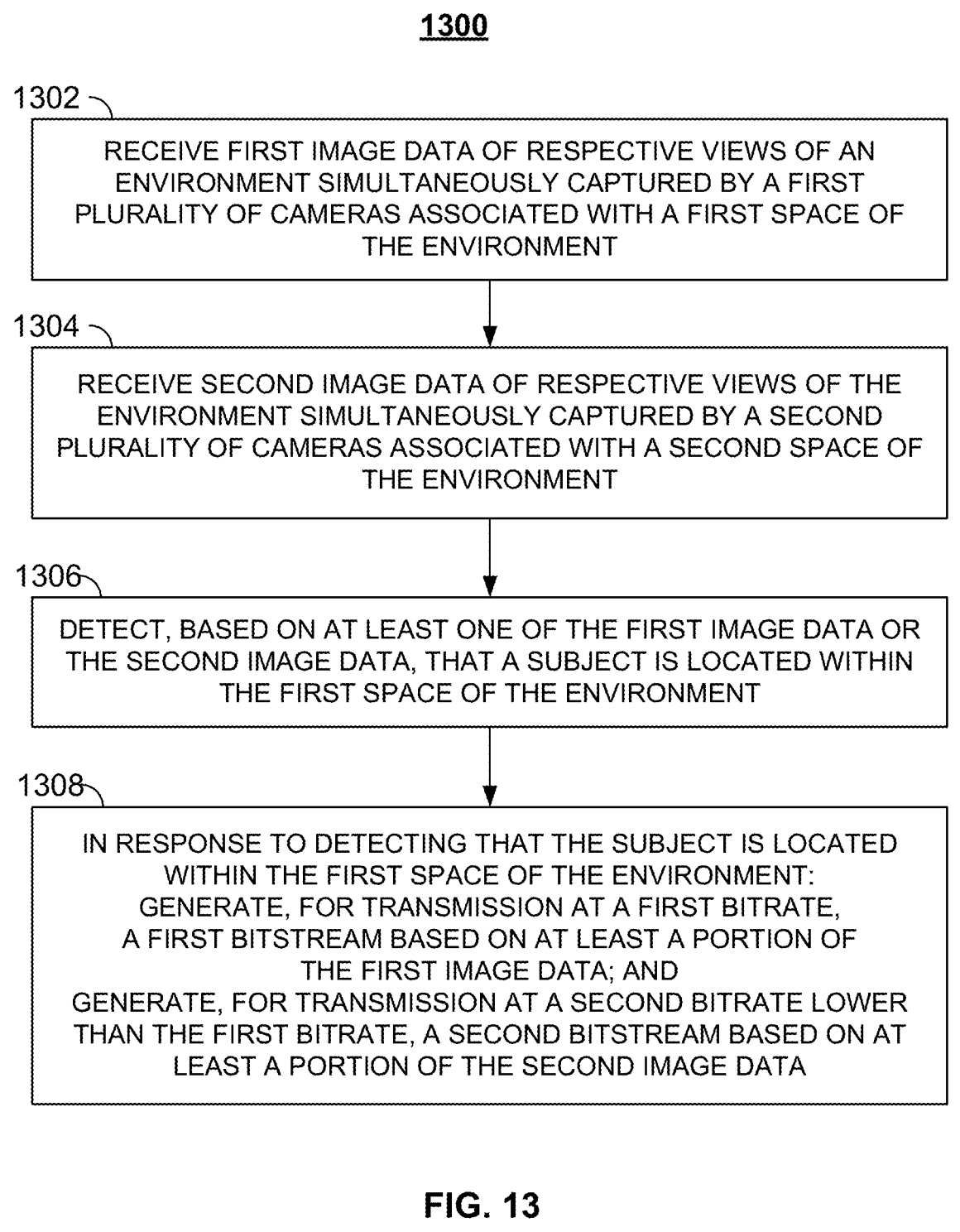

RECEIVE FIRST IMAGE DATA OF RESPECTIVE VIEWS OF AN ENVIRONMENT SIMULTANEOUSLY CAPTURED BY A FIRST PLURALITY OF CAMERAS ASSOCIATED WITH A FIRST SPACE OF THE ENVIRONMENT

1304

RECEIVE SECOND IMAGE DATA OF RESPECTIVE VIEWS OF THE ENVIRONMENT SIMULTANEOUSLY CAPTURED BY A SECOND PLURALITY OF CAMERAS ASSOCIATED WITH A SECOND SPACE OF THE ENVIRONMENT

1306

DETECT, BASED ON AT LEAST ONE OF THE FIRST IMAGE DATA OR THE SECOND IMAGE DATA, THAT A SUBJECT IS LOCATED WITHIN THE FIRST SPACE OF THE ENVIRONMENT

1308

IN RESPONSE TO DETECTING THAT THE SUBJECT IS LOCATED WITHIN THE FIRST SPACE OF THE ENVIRONMENT:
GENERATE, FOR TRANSMISSION AT A FIRST BITRATE,
A FIRST BITSTREAM BASED ON AT LEAST A PORTION OF THE FIRST IMAGE DATA; AND
GENERATE, FOR TRANSMISSION AT A SECOND BITRATE LOWER THAN THE FIRST BITRATE, A SECOND BITSTREAM BASED ON AT LEAST A PORTION OF THE SECOND IMAGE DATA

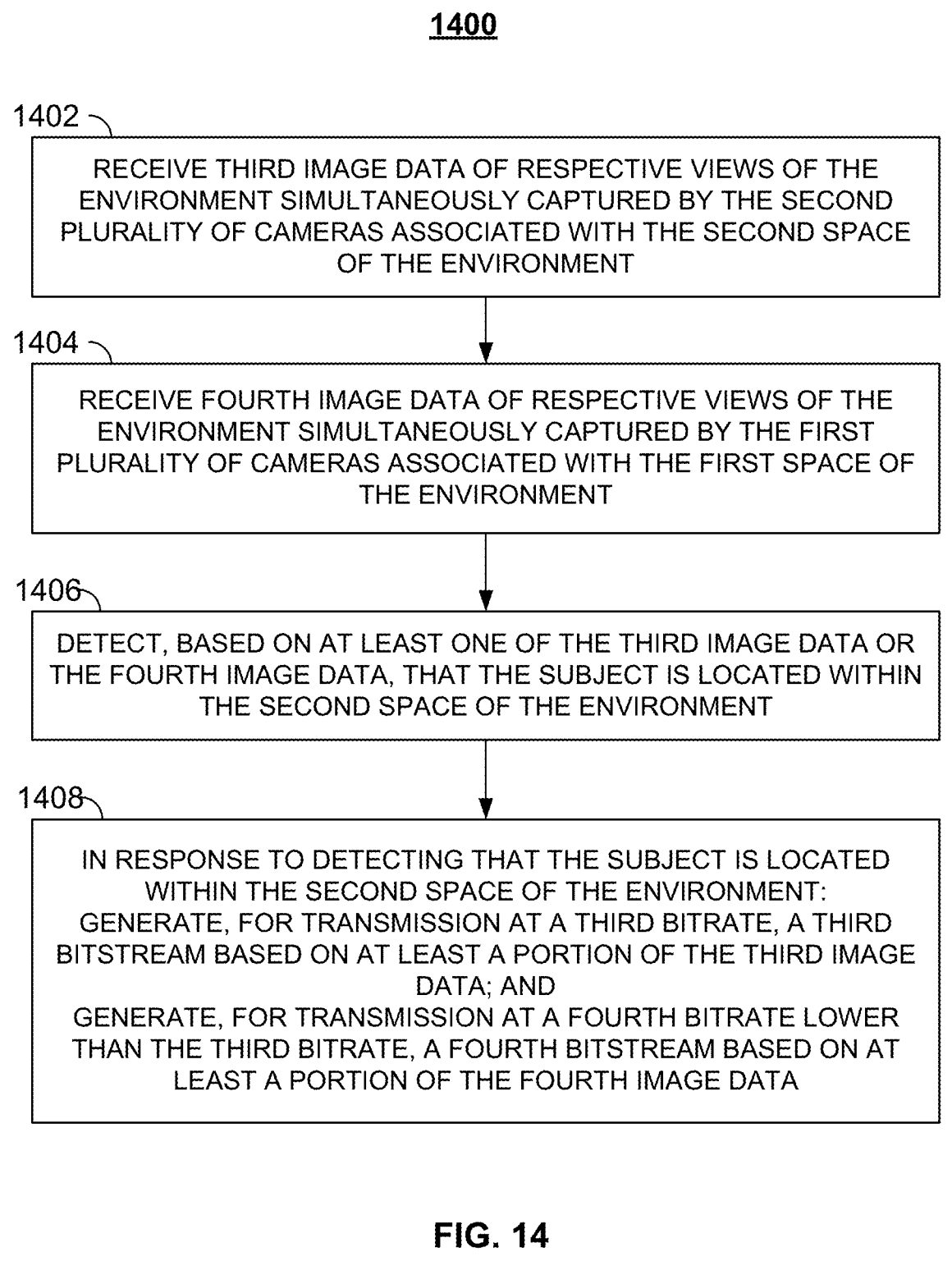

RECEIVE THIRD IMAGE DATA OF RESPECTIVE VIEWS OF THE
ENVIRONMENT SIMULTANEOUSLY CAPTURED BY THE SECOND
PLURALITY OF CAMERAS ASSOCIATED WITH THE SECOND SPACE
OF THE ENVIRONMENT

1404

RECEIVE FOURTH IMAGE DATA OF RESPECTIVE VIEWS OF THE
ENVIRONMENT SIMULTANEOUSLY CAPTURED BY THE FIRST
PLURALITY OF CAMERAS ASSOCIATED WITH THE FIRST SPACE OF
THE ENVIRONMENT

1406

DETECT, BASED ON AT LEAST ONE OF THE THIRD IMAGE DATA OR
THE FOURTH IMAGE DATA, THAT THE SUBJECT IS LOCATED WITHIN
THE SECOND SPACE OF THE ENVIRONMENT

1408

IN RESPONSE TO DETECTING THAT THE SUBJECT IS LOCATED
WITHIN THE SECOND SPACE OF THE ENVIRONMENT:
GENERATE, FOR TRANSMISSION AT A THIRD BITRATE, A THIRD
BITSTREAM BASED ON AT LEAST A PORTION OF THE THIRD IMAGE
DATA; AND
GENERATE, FOR TRANSMISSION AT A FOURTH BITRATE LOWER
THAN THE THIRD BITRATE, A FOURTH BITSTREAM BASED ON AT
LEAST A PORTION OF THE FOURTH IMAGE DATA

FIG. 14

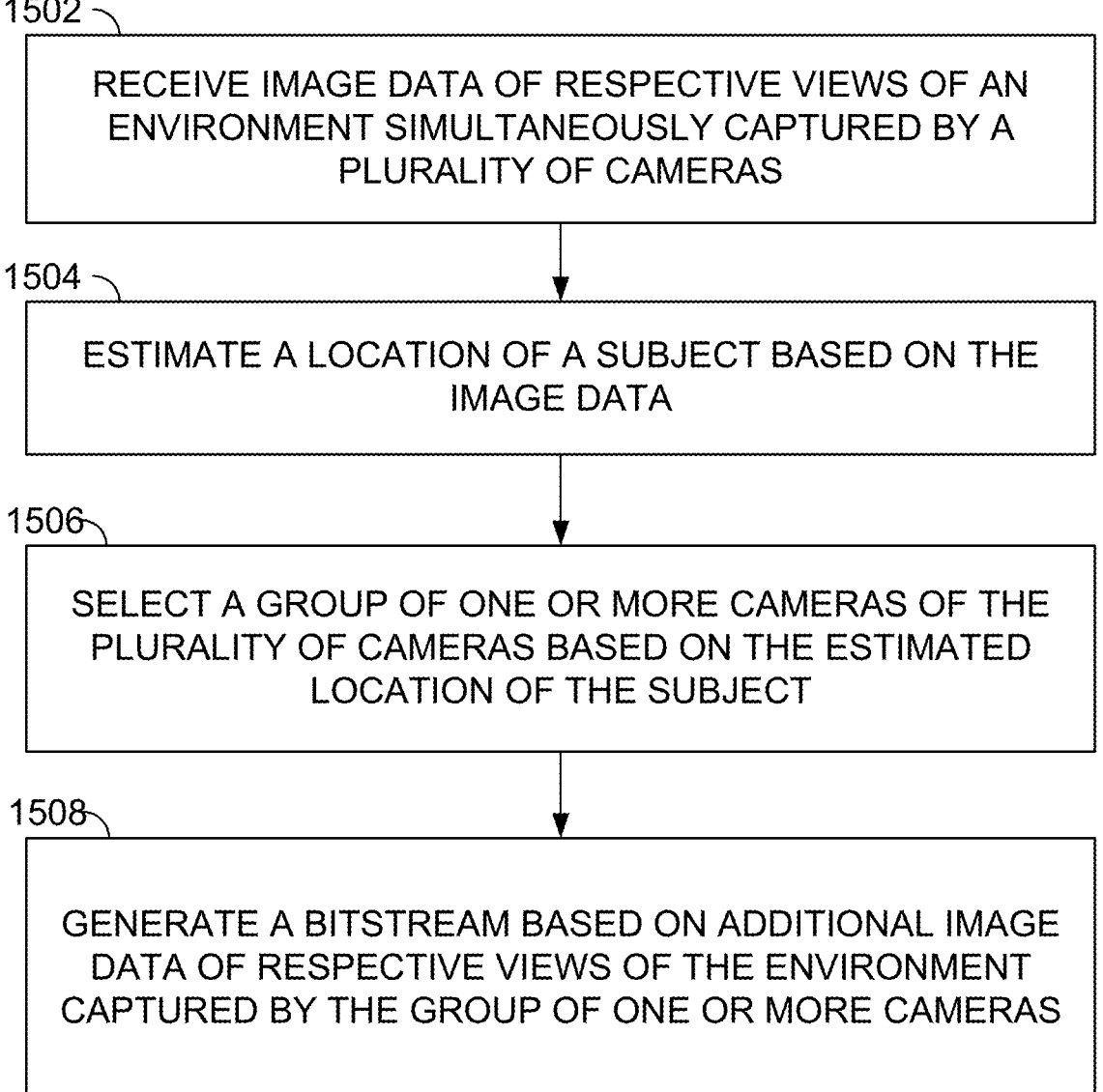

1500

1502

RECEIVE IMAGE DATA OF RESPECTIVE VIEWS OF AN ENVIRONMENT SIMULTANEOUSLY CAPTURED BY A PLURALITY OF CAMERAS

1504

ESTIMATE A LOCATION OF A SUBJECT BASED ON THE IMAGE DATA

1506

SELECT A GROUP OF ONE OR MORE CAMERAS OF THE PLURALITY OF CAMERAS BASED ON THE ESTIMATED LOCATION OF THE SUBJECT

1508

GENERATE A BITSTREAM BASED ON ADDITIONAL IMAGE DATA OF RESPECTIVE VIEWS OF THE ENVIRONMENT CAPTURED BY THE GROUP OF ONE OR MORE CAMERAS

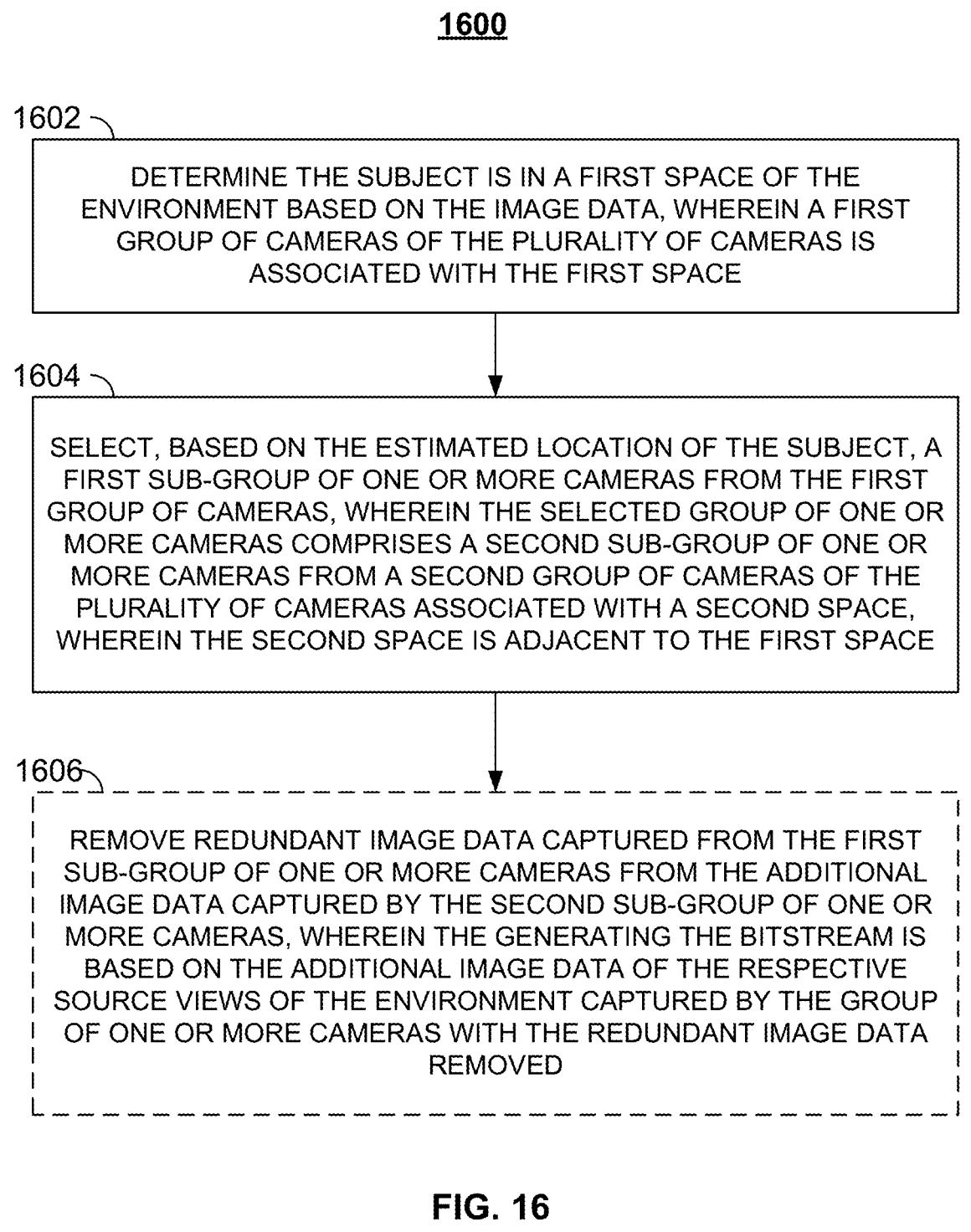

DETERMINE THE SUBJECT IS IN A FIRST SPACE OF THE ENVIRONMENT BASED ON THE IMAGE DATA, WHEREIN A FIRST GROUP OF CAMERAS OF THE PLURALITY OF CAMERAS IS ASSOCIATED WITH THE FIRST SPACE

1604

SELECT, BASED ON THE ESTIMATED LOCATION OF THE SUBJECT, A FIRST SUB-GROUP OF ONE OR MORE CAMERAS FROM THE FIRST GROUP OF CAMERAS, WHEREIN THE SELECTED GROUP OF ONE OR MORE CAMERAS COMPRISES A SECOND SUB-GROUP OF ONE OR MORE CAMERAS FROM A SECOND GROUP OF CAMERAS OF THE PLURALITY OF CAMERAS ASSOCIATED WITH A SECOND SPACE, WHEREIN THE SECOND SPACE IS ADJACENT TO THE FIRST SPACE

1606

REMOVE REDUNDANT IMAGE DATA CAPTURED FROM THE FIRST SUB-GROUP OF ONE OR MORE CAMERAS FROM THE ADDITIONAL IMAGE DATA CAPTURED BY THE SECOND SUB-GROUP OF ONE OR MORE CAMERAS, WHEREIN THE GENERATING THE BITSTREAM IS BASED ON THE ADDITIONAL IMAGE DATA OF THE RESPECTIVE SOURCE VIEWS OF THE ENVIRONMENT CAPTURED BY THE GROUP OF ONE OR MORE CAMERAS WITH THE REDUNDANT IMAGE DATA REMOVED

FIG. 16

SYSTEMS AND METHODS FOR TRAVERSING VIRTUAL SPACES

BACKGROUND

This disclosure is directed to systems and methods for providing an immersive video experience, and more particularly to systems and methods for addressing latency and bandwidth issues in traversing an environment of the immersive video experience.

SUMMARY

Immersive extended reality (XR) technology (e.g., augmented reality (AR), virtual reality (VR), and mixed reality (MR) technology) is emerging and may support 6-Degree of freedom (DoF), 3-DOF, or 3-DoF+ experience for a user. A 6-DoF XR technology may indicate a number of axes of motion in 3D space that is supported by the XR technology (e.g., 3 translational axes—x, y, and z, and 3 rotational axes—roll, pitch, and yaw). A 6-DoF XR technology may enable a user to interact with an XR environment in 6-DoF (e.g., in all 6 rotational and translational axes). A 3-DoF XR technology may enable a user to interact with an XR environment in 3-DoF (e.g., in 3 rotational axes or 3 translational axes, but not both). A 3-DoF+XR technology may enable a user to interact with an XR environment in 3-DoF with some additional limited support for movements in another 3DoF (e.g., enables user interaction in 3 rotational axes, and have some limited interaction or movement along the 3 translational axes). International standard organizations, such as the Motion Pictures Experts Group (MPEG), research and standardize system architecture and coding technologies for 6-DoF and 3-DoF immersive or volumetric video content. MPEG immersive video (MIV) standard is one example of a coding technology that may be used by 6-DoF, 3-DoF, and 3-DoF+ XR technology. However, because of multiple camera (input) source views used for an immersive XR service, the computational complexity and required bandwidth for streaming (e.g., immersive or volumetric video content) are serious technical hurdles and cause problems such as severe virtual space traversing latency.

In one approach, a 6-DoF XR service may be provided for an environment including multiple virtual spaces, each space having multiple camera views (e.g., camera source views) compressed using independent MIV encoders for each virtual space in an environment. A problem with this approach is that a client device (e.g., a personal computer (PC), HMD, mobile phone, tablet, a set top box (STB), etc.) of a user cannot receive partial data for an intermediate view to reduce the space traversing latency. For example, a user may want to move (e.g., change a view on the client device) from a current virtual space to another, and the user may be in an intermediate space (e.g., the middle of or between two spaces). If a user is in an intermediate space, the user may want to view the intermediate space by having the client device generate intermediate views using cameras in the adjacent spaces (e.g., some from the current space, and some from an adjacent space). However, with multiple camera source views compressed using independent MIV encoders for each space, a client device of the user may need to receive whole or complete bitstreams in adjacent spaces, which significantly increases the latency. For example, when moving from displaying a view of a first virtual space to a view of a second virtual space, the client device of the user may need to receive the whole bitstream of the first space (e.g., multiple camera views from cameras for the first space) and the whole bitstream of the second space (e.g., multiple camera views from cameras for the second space).

To help address these problems, systems and methods are described herein to enable seamless virtual space traversing. For example, a system may enable virtual space traversing with low latency or low latency inter-space traversing. Inter-space traversing may refer to when a subject moves from one virtual space to another (e.g., user view moving from one space to another) when there are physically separated spaces in virtual space (e.g., environment). In some embodiments, a system (e.g., using an immersive video application) receives first image data of respective views of an environment simultaneously captured by a first plurality of cameras associated with a first space of the environment. The system may receive second image data of respective views of the environment simultaneously captured by a second plurality of cameras associated with a second space of the environment. For example, an environment may have multiple spaces, with each space having corresponding cameras (e.g., cameras with source views covering a space), and the first image data and the second image data may be simultaneously captured by the first plurality of cameras and the second plurality of cameras, respectively.

The system may detect, based on at least one of the first image data or the second image data, that a subject is located within the first space of the environment. A subject may be a person or an object of interest in the environment (e.g., to a user viewing an environment on a client device). For example, if the environment is a basketball court (e.g., having multiple spaces, each space being captured by multiple cameras), the subject may be a person such as a basketball player or an object such as the basketball (e.g., a user of a client device may have interest in viewing a basketball game from a viewpoint including the subject, centered on the subject, or from the perspective of the subject). In some embodiments, the subject is a user (e.g., user of a client device).

In response to detecting that the subject is located within the first space of the environment, the system may generate, for transmission at a first bitrate, a first bitstream based on at least a portion of the first image data, and the system may generate, for transmission at a second bitrate lower than the first bitrate, a second bitstream based on at least a portion of the second image data. The second space of the environment may be adjacent to the first space. This helps to address the problem of virtual space traversing latency by providing a client device of a user with a bitstream (e.g., a high-quality, high-bitrate bitstream) for the current space, and at a same or substantially same time, prefetching bitstream(s) (e.g., medium-quality, lower-bitrate bitstream) from other space(s) (e.g., adjacent spaces) to enable instant or seamless space traversing. For example, as a user is moving from one virtual space to another, the system (e.g., immersive XR service) may provide (e.g., generate for transmission) a high-bitrate bitstream for the current space and a lower-bitrate bitstream for the adjacent space, so that a client device receiving the bitstreams may render a viewport image (video) in an intermediate space while reducing the latency and required bandwidth.

In some embodiments, the second space of the environment is adjacent to the first space. For example, the system may generate a lower bit-rate bitstream for any space that is adjacent to the current space. In some embodiments, the system may determine a direction of motion of the subject in the first space of the environment based on at least a portion of the first image data or the second image data, and the second space may be adjacent to the first space and in the direction of motion of the subject in the first space of the environment. For example, the system may generate lower bit-rate bitstreams from one or more spaces adjacent to the current space that a subject is located in (e.g., current space a user may be viewing) and in the direction the subject is moving in (e.g., if subject is in space 1 and moving in a direction towards adjacent space 2, generating a lower-bitrate bitstream for space 2). The system may determine the direction of motion of the subject is based on a direction the subject is facing. The system may determine the direction of motion of the subject is based on a pose of the subject.

In some embodiments, the system may receive third image data of respective views of the environment simultaneously captured by the second plurality of cameras associated with the second space of the environment. The system may receive fourth image data of respective views of the environment simultaneously captured by the first plurality of cameras associated with the first space of the environment. The system may detect, based on at least one of the third image data or the fourth image data, that the subject is located within the second space of the environment. In response to detecting that the subject is located within the second space of the environment, the system may generate, for transmission at a third bitrate, a third bitstream based on at least a portion of the third image data, and the system may generate, for transmission at a fourth bitrate that is lower than the third bitrate, a fourth bitstream based on at least a portion of the fourth image data. For example, if the system detects that a subject has moved from a first space to the second space, the system may generate a high-bitrate bitstream of views of the environment captured by the second cameras of the second space. The system may generate lower-bitrate bitstream of views of the environment captured by the first cameras of the first space, the first space being adjacent to the second space. The system may transmit the high-bitrate bitstream and the low-bitrate bitstreams to a client device.

In some embodiments, the system may receive third image data of respective views of the environment simultaneously captured by the second plurality of cameras associated with the second space of the environment. The system may receive fourth image data of respective views of the environment simultaneously captured by a third plurality of cameras associated with a third space of the environment, wherein the third space of the environment is adjacent to the second space of the environment. The system may detect, based on at least one of the third image data or the fourth image data, that the subject is located within the second space of the environment. In response to detecting that the subject is located within in the second space of the environment, the system may generate, for transmission at a third bitrate, a third bitstream based on at least a portion of the third image data, and the system may generate, for transmission at a fourth bitrate lower than the third bitrate, a fourth bitstream based on at least a portion of the fourth image data. For example, if the system detects that a subject has moved from a first space to the second space, the system may generate a high-bitrate bitstream of views of the environment captured by the second cameras of the second space. The system may generate lower-bitrate bitstream of views of the environment captured by third cameras of a third space that are adjacent to the second space. For example, the system may determine a subject is moving in the second space in a direction towards a third space, and generate the lower-bitrate bitstream of views of the environment captured by third cameras of the third space. The system may transmit the high-bitrate bitstream and the low-bitrate bitstream to a client device. Similar to the previous example embodiment, a subject may have moved from a first space to a second space, and the system may generate a high-bitrate bitstream based on views captured by second cameras of the second space. In the previous example, the system may generate a lower bitrate bitstream based on views captured by first cameras in the first space that the subject had moved from. In this example, the system may generate a lower bitrate bitstream for views captured by third cameras of a third space adjacent to the second space.

In some embodiments, a system generates a low-bitrate bitstream based on image data of respective source views of a space captured by one or more selected cameras of a plurality of cameras associated with the space. The system may generate a high-bitrate bitstream based on difference image data, the difference image data being based on image data of respective source views of the space captured by the plurality of cameras and reconstructed image data based on the low-bitrate bitstream. The system may select the high-bitrate bitstream or the low-bitrate bitstream for transmission to a client device.

In some embodiments, the system generates the reconstructed image data by decoding and reconstructing the low-bitrate bitstream. The reconstructed image data may be the reconstructed decoded low-bitrate bitstream. In some embodiments, the system downsamples the image data of the respective source views of the space captured by the one or more selected cameras. The low-bitrate bitstream may be generated based on the downsampled image data. The system may generate the reconstructed image data by decoding, reconstructing, and upsampling the low-bitrate bitstream. The reconstructed image data may be the upsampled reconstructed decoded low-bitrate bitstream.

In some embodiments, each of the respective source views of the space captured by the plurality of cameras may be a basic view type or an additional view type. Each basic view type may cover a larger region of the space than each additional view type. Each of the respective source views of the space captured by the one or more selected cameras may be the basic view type. In some embodiments, a basic view is calculated and selected using any suitable technique (e.g., view optimizer) from any suitable system (e.g., MIV system, any suitable coding system), and may be a view from a camera that covers a large area, and an additional view may be a view from the other cameras.

In some embodiments, the one or more selected cameras are the plurality of cameras. The system may downsample the image data of respective source views of the space captured by the plurality of cameras associated with the space. The low-bitrate bitstream may be generated based on the downsampled image data. The system may generate the reconstructed image data by decoding, reconstructing, and upsampling the low-bitrate bitstream. The reconstructed image data may be the upsampled reconstructed decoded low-bitrate bitstream.

In some embodiments, a system may enable providing sub-group camera bitstreams and inter-space pruning. For example, a system may receive image data of respective views of an environment simultaneously captured by a plurality of cameras. The system may estimate a location of a subject based on the image data. The system may select a group of one or more cameras of the plurality of cameras based on the estimated location of the subject. For example, the group of one or more cameras of the plurality of cameras may be a sub-group of cameras in an intermediate space. The system may generate a bitstream based on additional image data of respective views of the environment captured by the group of one or more cameras. This helps to address the problem of virtual space traversing latency when a user (e.g., view of the user and/or subject) moves from one space to another, as sub-group camera bitstreams may be processed as an intermediate bitstream, separately and in advance. For example, the latency may be reduced because a client device may have previously received bitstreams of the current space, and may generate virtual views after decoding the intermediate bitstream (e.g., using the prefetched partial data, generated and transmitted by the system). The system may perform an inter-space pruning process. An inter-space pruning process may refer to a pruning process for cameras in an intermediate space. A pruning process may be the removal of pixels that are the same in different views. For example, if a same pixel is visible in two or more views, the pixel may be pruned from all views except for one. In some embodiments, there may be a first and a second subgroup of cameras in an intermediate space. For example, an intermediate space may be between a first space and a second space, there may be a first subgroup of cameras associated with a first space and a second subgroup of cameras associated with a second space. The system may select the subgroup of cameras in the first and second space based on the estimated location of the subject being in the intermediate space. In some embodiments, the system may provide inter-space pruning (removal of pixels that are the same in different views) between cameras in the first subgroup associated with the first space and cameras in the second subgroup of cameras associated with the second space.

In some embodiments, the image data of the respective views of each camera of the group of one or more cameras include a portion of the environment at the estimated location of the subject. For example, a sub-group of cameras from a space may be selected based on image data of each camera's view including a portion of the environment at the estimated location of the subject. In some embodiments, the subject is included in the environment, and the portion of the environment at the estimated location of the subject may include a portion of the subject. In some embodiments, the system may estimate the location of the subject based on identifying the subject in image data of respective views of cameras and determining a centroid of subject (e.g., estimated location of the subject is at a center point of the subject). In some embodiments, the estimated location of the subject may be a predicted location of the subject (e.g., subject is not identified at the location, but is predicted to be at a later time). Determining the estimated location of the subject may help address latency issues, as the system may select one or more cameras (e.g., a subset of cameras, all the cameras) from adjacent spaces based on the estimated location (e.g., a current or predicted future location) of the subject and prefetch bitstreams of the selected cameras in advance of a subject moving to the adjacent space.

In some embodiments, the system may estimate the location of the subject based on image data by identifying in a subset of the image data the subject, of which multiple images were simultaneously captured by two or more of the plurality of cameras, determining a direction of motion of the subject based on the subset of the image data, and determining the estimated location of the subject based on the direction of motion of the subject. The system may determine the direction of motion of the subject based on a direction the subject is facing. The system may determine the direction of motion of the subject is based on a pose of the subject. For example, the system may determine a front and a back of the subject, and determine the direction of motion based on a direction the front of the subject is facing. For example, the system may determine a pose of a basketball player, such as the basketball player pointing in a particular direction, and determine the direction of motion based on the pose.

The system may identify the subject in a first subset of the image data at a first time. The system may determine a first location of the subject by computing a first center point of the subject in the first subset of the image data. The system may identify the subject in a second subset of the image data at a second time after the first time. The system may determine a second location of the subject by computing a second center point of the subject in the second subset of the image data. The system may determine a velocity vector of the subject based on the first location, the second location, the first time, and the second time. The system may multiply the velocity vector by a time period to determine the estimated location of the subject.

In some embodiments, the system may determine the subject is in a first space of the environment based on the image data, wherein a first group of cameras of the plurality of cameras is associated with the first space. The system may select, based on the estimated location of the subject, a first sub-group of one or more cameras from the first group of cameras, wherein the group of one or more cameras comprises a second sub-group of one or more cameras from a second group of cameras of the plurality of cameras associated with a second space, wherein the second space is adjacent to the first space. The system may remove redundant image data captured from the first sub-group of one or more cameras from the additional image data captured by the second sub-group of one or more cameras, wherein the generating the bitstream is based on the additional image data of the respective views of the environment captured by the group of one or more cameras with the redundant image data removed.

In some embodiments, at least one camera of the first sub-group and the second sub-group of one or more cameras is a 360-degree camera. Removing the redundant image data may include removing redundant image data from the 360-degree camera. The system may select a third sub-group of one or more cameras from a third group of cameras of the plurality of cameras associated with a third space based on the estimated location of the subject, wherein the third space is adjacent to the first space. The system may remove redundant image data captured from the first and second sub-groups of one or more cameras from additional third image data captured by the third sub-group of one or more cameras to generate pruned third image data. The system may generate a second bitstream based on the pruned third image data.

In some embodiments, the system may determine the subject is in a first space of the environment based on the image data, wherein a first group of cameras of the plurality of cameras is associated with the first space. The system may select, based on the estimated location of the subject, a first sub-group of one or more cameras from the first group of cameras, wherein the group of one or more cameras comprises a second sub-group of one or more cameras from a second group of cameras of the plurality of cameras associated with a second space, wherein the second space is adjacent to the first space. In some embodiments, each of the cameras of the first sub-group and the second sub-group of one or more cameras is a 2D perspective camera.

In some embodiments, systems and methods enable seamless virtual space traversing while reducing the latency and required bandwidth. For example, the systems and methods may enable client-driven seamless virtual space traversing. In some embodiments, systems and methods use multi-pass encoding for generating multi-bitrate bitstreams while removing the view redundancies. In some embodiments, systems and methods use inter-space pruning and coding method for additional camera views at intermediate space. The systems and methods may be applied to standards (e.g., present, future, any suitable standards, etc., of which MIV is a non-limiting example), servers (e.g., VR server, extended reality (XR) server—augmented reality (AR), virtual reality (VR), mixed reality (MR) server, or some combination thereof, etc.), head-mounted displays (HMD), and set-top boxes.

As a result of the use of these techniques, seamless virtual space traversing for 3-DoF+ or 6-DoF XR may be enabled.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 2 shows an illustrative example of seamless virtual space traversing for XR, in accordance with some embodiments of this disclosure.

FIG. 10A shows a flowchart of an illustrative process for seamless interspace traversing, in accordance with some embodiments of this disclosure.

FIG. 10B is a flowchart of a detailed illustrative process for prefetching algorithm for intermediate view bitstreams, in accordance with some embodiments of this disclosure.

FIG. 11 is an illustrative example of content preparation and seamless interspace traversing, in accordance with some embodiments of this disclosure.

FIG. 13 is a flowchart of a detailed illustrative process for seamless virtual space traversing with low latency using multi-bitrate bitstreams, in accordance with some embodiments of this disclosure.

FIG. 14 is a flowchart of a detailed illustrative process for multi-pass coding for generating multi-bitrate bitstreams, in accordance with some embodiments of this disclosure.

FIG. 15 is a flowchart of a detailed illustrative process for selecting cameras based on an estimated location of a subject, in accordance with some embodiments of this disclosure.

FIG. 16 is a flowchart of a detailed illustrative process for removing view redundancies of cameras in an intermediate space, in accordance with some embodiments of this disclosure.

DETAILED DESCRIPTION

Figure 1:
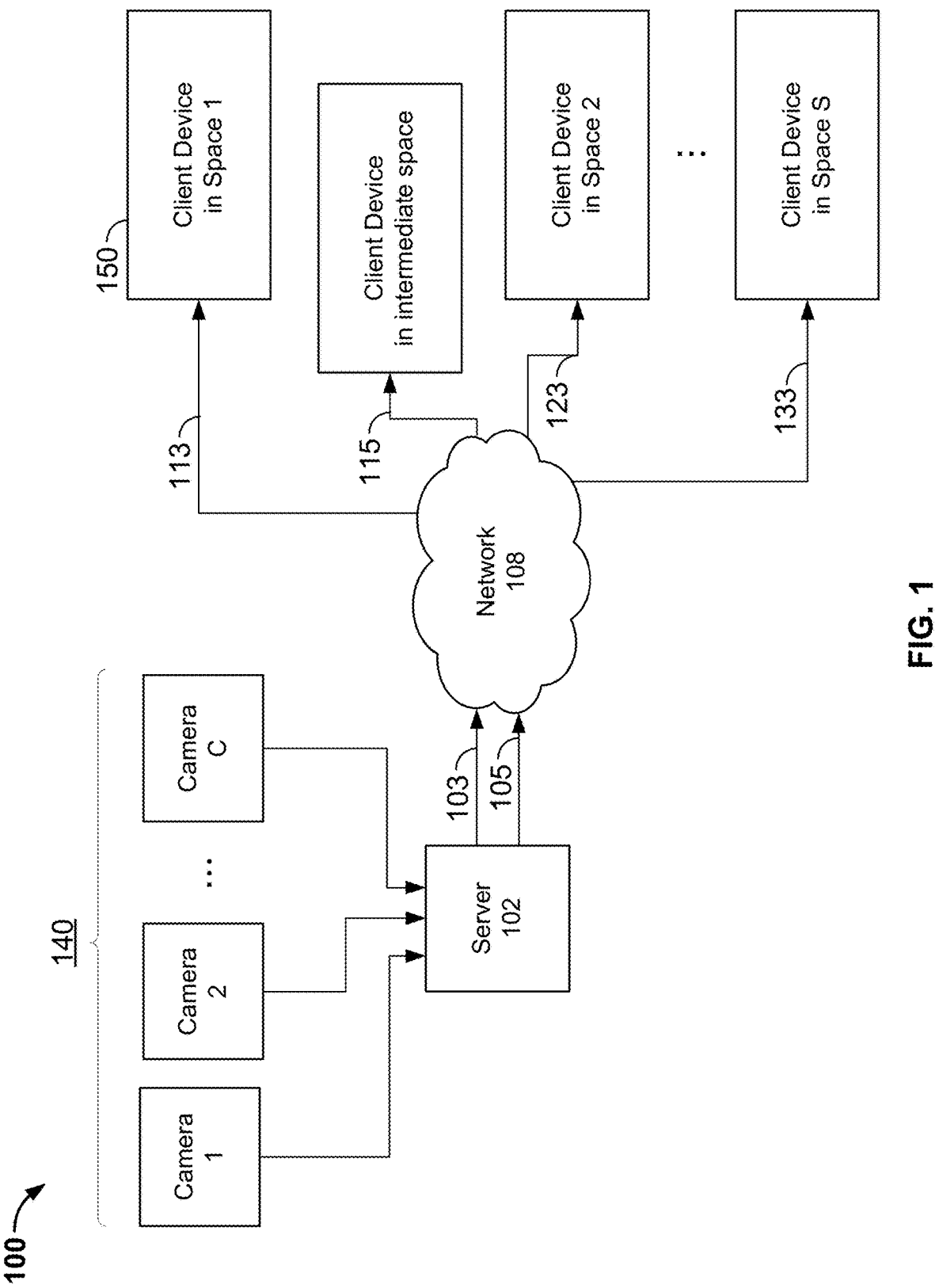
FIG. 1 shows an illustrative example of an XR streaming system, in accordance with some embodiments of this disclosure.

Metaverse or extended reality technology is emerging, and XR video compression and streaming is one of the key technologies to enable the metaverse service. ISO/IEC (International Organization for Standardization/International Electrotechnical Commission) JTC1 (Joint Technical Committee 1) SC29 (Sub committee 29) is a standardization subcommittee that does standardization work covering coding of audio, picture, multimedia and hypermedia information. In one approach, ISO/IEC JTC1 SC29 has standardized MPEG Immersive Video (MIV), and a first version for three-degree of freedom plus (3DoF+) may be used for providing 6-DoF XR service. However, 3DoF+ provides a limited 6-DoF experience to users, and there are conceptual differences between 3DoF+ and 6-DoF.

In one approach, a computer generated (CG) XR service may provide an immersive video experience to a user. For example, the CG XR service may render the viewport image (video) according to a user's viewpoint, which may not be difficult because every vertex data in the space may be given. However, this approach may have problems for providing 6-DoF for real image-based XR service using multiple cameras. For example, real images from cameras capturing a live sporting event may have partial 2D texture and depth information, and not all vertex information. Thus, switching viewport (e.g., according to user head-mounted display HMD movement and/or viewport movement) may be difficult. Even if advanced rendering technology makes viewport switching possible, the subjective quality may be poor. In addition, the 6-DoF scenario may need multiple camera inputs. The required bandwidth and number of decoders may each be fairly large and thus may make providing 6-DoF XR streaming service with bitrate adaptation and device capabilities using MIV challenging. For example, regarding bitrate adaptation, because of the large amount of bandwidth requirement, the bandwidth adaptation for a client device may be difficult. Thus, TMIV encoder with a bitrate adaptation feature may be helpful. For example, because of the needs of 2D video decoders for each atlas in an MIV bitstream, the device capability may be relevant. For example, if there are not enough decoders in the client device, the MIV bitstream cannot be decoded and rendered.

In one approach, multi-view video compression may be used for providing an immersive XR service. Multi-view video compression may exploit reducing inter-view redundancies and may improve efficiency in coding. For example, multi-view video coding (MVC) and multi-view high-efficiency video coding (MV-HEVC) may be used as extensions of advanced video coding (AVC), and HEVC coding standard, respectively. This approach has problems such as complexity and additional efforts for designing a decoder.

In one approach, the MIV standard may be used for providing an immersive XR service (e.g., an MIV-compliant 6-DoF immersive video streaming system). For example, there are two modes in the MIV standard (1) MIV mode and (2) MIV view mode. In MIV view mode, an MIV encoder encodes all 2D textures and depth-maps without system level inter-view redundancy removal. This approach may have problems such as requiring resources such as high bandwidth.

In the MIV mode, an MIV encoder divides a camera input (source) views into basic view(s) and additional view(s), and the inter-view redundancy is removed from the additional views by using a pruning process. A basic view may be calculated and selected by using the view optimizer in an MIV system and may be a view from a camera that covers a large area. An additional view may be a view from the other cameras. A basic view may be a view from a camera that covers a large area. An additional view may be a view from a camera that covers an area that is smaller than a basic view. Inter-view redundancy may be redundant information in two different camera views (e.g., pixels that are the same in different views, same object visible in different views). A pruning process may remove the inter-view redundancy. For example, a pruning process may remove the inter-view redundancy between basic and additional views. Each view from the respective cameras may have (x, y, z) vertex information, and the images captured from the views may be moved to a same position based on the vertex information. When the images are moved to the same position, the differences may be found. For example, the basic view and the additional view may be moved to the same position using the vertex information. A patch may be the differences between two views. The MIV encoder extracts the residuals (e.g., differences) as rectangles, defined as patches, and merges them into atlas(es). For example, inter-view redundancy between basic and additional view(s) may be removed from the additional view(s). An atlas may be a picture including visual data from many input views. Each basic view may be considered a big patch, and the basic views are also included in the atlases. The basic views may be placed into one atlas, and the patches may be placed into another atlas. Information about the atlases such as resolution, location of the patches, the number of frames, are stored as an MIV bitstream.

A number of texture and geometry atlases are generated (e.g., two texture and two geometry atlases), and the geometry atlases could be downsampled by a factor (e.g., factor of 2×2). In some embodiments, downsampling is optional. A texture atlas may include texture (e.g., video, color) information. A geometry atlas may include depth information (e.g., depth map). The limited number of texture and geometry atlases that are generated may be because MIV aims to be used in a high- to low-end device (e.g., compatible with both high-end and low-end devices, as well as devices that are in between a high-end device and low-end device). A high-end device may be a device with a large amount of computing power or a technically sophisticated device. A low-end device may be a device without a small amount of computing power.

After the atlases are generated, the video encoder encodes the atlases, and the bitstreams are transmitted after encapsulation. Encapsulation may refer to the bitstreams being encapsulated in a container file or wrapper (e.g., file format to encapsulate bitstreams). A wrapper may be a file format for encapsulating different bitstreams into one file. Decapsulation may refer to decapsulating the bitstreams from the container file. After decapsulation, the bitstreams are decoded, and the intermediate view may be synthesized by a view synthesizer according to a user viewpoint. The intermediate view may be the generated (calculated) view using two or more views according to user viewport movement. For example, the intermediate view may represent a view of a user. The intermediate view may be synthesized by combining information from multiple camera views. The MIV encoder may synthesize the virtual views for quality assessment purposes. One problem with this approach is that it does not support variable bandwidth or bitrate adaptation. Another problem with this approach is that it does not provide functionalities for channel traversing or XR space transition. For a client device (e.g., a PC, HMD, mobile phone, tablet, STB, etc.) to change a XR broadcast channel or independent virtual spaces, (1) the request message may be transferred to a XR server (e.g., a video service provider (VSP)), (2) a new encoded MIV bitstream may be streamed to the client device, and (3) decoding and rendering processes may follow. The processes cause latency (e.g., more than a second) and may severely downgrade the quality of service of the XR streaming. The size of the bitstream used in 3-DoF+ or 6-DoF XR applications may be much larger than the size of the bitstream used for 3-DoF XR applications due to the use of multiple camera inputs in 3-DoF+ or 6-DoF XR applications (e.g., 10-30 camera inputs, or any suitable number of camera inputs). Latency is also much greater than motion-to-photon (MTP) latency (e.g., 20-100 ms, or any suitable time duration) to adapt to users' viewport movement. Real-time immersive XR streaming with channel traversing functionality (e.g., ability for a client device to change XR broadcast channels) is challenging.

In some embodiments, systems and methods enable seamless virtual space traversing while reducing the latency and required bandwidth. For example, the systems and methods may enable client-driven seamless virtual space traversing. In some embodiments, a system may enable virtual space traversing with low latency. For example, the system may support low latency inter-space traversing. Inter-space traversing may refer to when a subject moves from one virtual space to another (e.g., user view moving from one space to another). For example, when there are physically separated spaces in virtual space (e.g., environment), a subject may move from a current virtual space to another. In some embodiments, systems and methods use multi-pass encoding for generating multi-bitrate bitstreams while removing view redundancies between different camera views. In some embodiments, systems and methods use inter-space pruning and coding method for additional camera views at an intermediate space. An intermediate space may refer to the middle area of or an area in between two or more spaces. The systems and methods may be applied to standards (e.g., present, future, any suitable standards etc.), XR servers, head-mounted displays (HMD), and other client devices. In some embodiments, header information may indicate if bitstream layer information is used in a client device for XR streaming. For example, a stored file (e.g., with camera view data) may have header information indicating if bitstream layer information is used. In some embodiments, the proposed multi-pass coding method and inter-space pruning and coding for additional camera views at intermediate space can be applied to any MPEG immersive video standard version or other immersive or volumetric video processing techniques. Multi-pass coding method may encode the input data with a single encoder multiple times. For example, the scalable high efficiency video coding (HEVC) uses the multi-pass encoding method for a base layer and enhancement layers. In some embodiments, the basic view selection module may be extended to drop redundant view information. A basic view selection module may receive source views and determine which views are basic views and which views are additional views. Basic views may be represented in an atlas while additional views may be pruned and packed in to one or more other atlases. MPEG has developed a reference software standard called the Test Model for Immersive Video (TMIV) that provides software and documentation for a reference encoder, decoder, and renderer. An updated MPEG-Immersive TMIV software (Test Model of MPEG immersive video software) implementation may be applied to a MIV version standard (e.g., present MIV version standard, future MIV version standards, etc.). In some embodiments, a fast-traversing method by reducing the latency may be applied to 3GPP SA (System Aspect) WG (working group) 4 codec (e.g., or any suitable codec).

FIG. 1 shows an illustrative example of an XR streaming system 100, in accordance with some embodiments of this disclosure. The system 100 may include a plurality of cameras 140, one or more servers 102, a network 108, and one or more client devices 150 configured to implement the techniques and methods disclosed herein. In some embodiments, 3DoF+XR technology may be used to traverse through XR environments. In some embodiments, 6DoF XR technology may be used to traverse through XR environments.

The plurality of cameras 140 include camera 1, camera 2, . . . to camera C, where Cis any suitable number of cameras. The cameras 140 provide or capture views (e.g., source views) of an environment. For example, an environment may have multiple spaces (e.g., space 1, space 2, . . . space S, where S is any suitable number of spaces), each space associated with a group of cameras. Each group of cameras associated with their corresponding space may provide source views of the space in the environment. For example, a first group of cameras may provide source views of space 1. The one or more servers 102 may receive image data of respective views of an environment simultaneously captured by the cameras 140 associated with the environment.

In some embodiments, the one or more servers 102 provide the XR streaming service. In some embodiments, the server 102 (e.g., 6-DoF XR server, 3-DoF+ XR server) provides a high bitrate MIV bitstream 103 for spaces (e.g., space 1, space 2, . . . space S) and a low bitrate (e.g., pre-fetched) MIV bitstream 105 (e.g., for intermediate space(s)) to client devices (e.g., 6-DoF XR clients, 3-DoF+ XR clients) over a network 108. An intermediate space may refer to a middle area of or an area between two or more spaces. For example, when there are physically adjacent spaces in a virtual space (e.g., environment), a subject can move from one space to another through an intermediate space. A subject may be a person or an object of interest in the environment (e.g., to a user viewing an environment on a client device). For example, if the environment is a basketball court (e.g., having multiple spaces that cover different (yet potentially at least partially overlapping) portions of the court, benches, scorer table, seating, etc., each space being captured by multiple cameras), the subject may be a person such as a basketball player or an object such as the basketball (e.g., a user of a client device may have interest in viewing a basketball game from a viewpoint including the subject, centered on the subject, or from the perspective of the subject). In some embodiments, the subject may be a user (e.g., user of a client device). In some embodiments, a system may determine that a subject moves to a physically adjacent space, and a prediction (e.g., estimation) of the next space that a subject may move to may be performed based on the subject location in the virtual spaces. If a subject moves between spaces, the system 100 may generate an intermediate view by using cameras in the adjacent spaces.

In some embodiments, the one or more client devices 150 may be a PC, HMD, mobile phone, or tablet. For example, the client device(s) in spaces 1 to S may receive a high bitrate MIV bitstream (e.g., for spaces 1 to S), and the client device(s) in intermediate spaces may receive a low bitrate MIV bitstream (e.g., for intermediate space). Client device in space 1 may receive a high bitrate MIV bitstream 113 (e.g., for space 1). Client device in an intermediate space may receive a low bitrate bitstream 115 (e.g., for the intermediate space). Client device in space 2 may receive a high bitrate MIV bitstream 123 (e.g., for space 2). Client device in space S may receive a high bitrate MIV bitstream 133 (e.g., for space S). In some embodiments, the client device(s) in each space is a same client device, a different client device, or some combination thereof. In some embodiments, there may be multiple client devices 150 in multiple spaces in an environment (e.g., space 1 to S, where S is any suitable number of spaces). In some embodiments, there may be one client device 150 moving throughout multiple spaces in an environment (e.g., space 1 to S).

In some embodiments, the system 100 enables virtual space traversing with low latency. For example, the system supports low latency inter-space traversing. Inter-space traversing may refer to when a subject moves from one virtual space to another (e.g., user view moving from one space to another). For example, when there are physically separated spaces in virtual space (e.g., environment), a subject may move from a current virtual space to another.

In some embodiments, the system 100 may use source cameras surrounding the subject for generating intermediate views. For example, the subject may be moving from space 1 to space 2, and be in an intermediate space in the middle of or between space 1 and space 2. The system 100 may use source cameras from space 1 and space 2 for generating intermediate views. For example, the system 100 may select a sub-group of cameras associated with space 1, and a sub-group of cameras associated with space 2 that surround the subject in the intermediate space. In some embodiments, partial sub-group cameras can be encoded using the MIV standard independently. For example, a sub-group of cameras associated with a space may be encoded using the MIV standard independently, rather than encoding all cameras associated with a space. In some embodiments, some number of cameras to north, east, west, and south-bound spaces can be encoded in advance. For example, the system 100 may encode a sub-group of cameras associated with one or more adjacent spaces in advance.

In some embodiments, there are two sub-groups of cameras in an intermediate space. For example, two sub-groups of one or more cameras can be encoded for seamless space traversing in advance of the subject moving from one space to another space. For example, in an intermediate space between a first space and a second space, there may be a first sub-group of cameras associated with the first space, and a second sub-group of cameras associated with the second space. In some embodiments, a pruning process can be performed for cameras in the intermediate space. In some embodiments, inter-space pruning may be optional. In some embodiments, inter-space pruning can reduce the total bitrates.

In some embodiments, the XR streaming service may enable seamless virtual space traversing while reducing the latency and required bandwidth. In some embodiments, the XR streaming service may enable multi-pass encoding for generating multi-bitrate bitstreams while removing the view redundancies. In some embodiments, the XR streaming service may enable inter-space pruning and coding method for sub-group cameras in an intermediate space.

FIG. 2 shows an illustrative example of seamless virtual space traversing, in accordance with some embodiments of this disclosure. For example, FIG. 2 shows an example use case of virtual space traversing with low latency. If there are multiple virtual spaces, with each space including multiple camera source views, each compressed with an independent encoder, the virtual space traversing latency will be high. Using a multi-pass coding method can reduce the latency by using multi-bitrate bitstreams. For example, the system may use a high quality bitstream to provide high quality immersive XR service for the current space. FIG. 2 shows the current space as space 1, where subject 201 is currently in space 1. The subject 201 may have virtual movement to or towards adjacent spaces (e.g., space 2, space 3, or space 4). In some embodiments, virtual movement may refer to movement of a subject in an XR environment. In some embodiments, virtual movement may refer to when a user wears an HMD and moves in a virtual space by using a controller. At the same time, the system may prefetch low-bitrate bitstreams from adjacent spaces (space 2, 3, and 4) for instant space traversing (changing). In some embodiments, a high quality bitstream is used for space 1, and a medium or lower quality bitstream is used for adjacent spaces 2, 3, and 4. In some embodiments, each of the adjacent spaces 2, 3, and 4 has a medium quality bitstream (each space has a corresponding medium quality bitstream).

In some embodiments, the system may generate the bitstream (e.g., low quality bitstream, lower bitrate bitstream, medium quality bitstream) after determining the subject is in space 1, and spaces 2, 3, and/or 4 are adjacent to space 1. In some embodiments, the system may generate the bitstream (e.g., low quality bitstream, lower bitrate bitstream, medium quality bitstream) after determining the subject is in space 1, and the subject 201 is facing or moving in a direction of spaces 2, 3, and/or 4.

In some embodiments, the system may determine a direction of motion of the subject in the first space of the environment based on at least a portion of image data from cameras in space 1, 2, 3 and/or 4). The system may generate lower bit-rate bitstreams from one or more spaces adjacent to the current space that a subject is located in (e.g., current space a user may be viewing) and in the direction the subject is moving in (e.g., if subject is in space 1 and moving in a direction towards adjacent space 2, generating a lower-bitrate bitstream for space 2).

For example, the system may estimate the location of the subject based on image data by identifying in a subset of the image data the subject, of which multiple images were simultaneously captured by two or more of the plurality of cameras (e.g., from cameras in space 1, 2, 3 and/or 4) and by determining a direction of motion of the subject (e.g., based on the image data from cameras in space 1, 2, 3 and/or 4). The system may determine the direction of motion of the subject based on a direction the subject is facing or a pose of the subject. For example, the system may determine a front and a back of the subject, and determine the direction of motion based on a direction the front of the subject is facing. The system may determine that the subject is facing in a direction of spaces 2, 3, and/or 4, and may estimate a location of the subject being in one of those spaces (e.g., future location of the subject). The system may generate the bitstream (e.g., low quality bitstream, lower bitrate bitstream, medium quality bitstream) including views from cameras in the adjacent spaces based on the estimated location of the subject being in one of the spaces.

In some embodiments, the system may determine the direction of motion of the subject based on determining a velocity vector of the subject. For example, the system may identify the subject in a first subset of the image data at a first time (e.g., image data from cameras in space 1, 2, 3, and/or 4 at a first time). The system may determine a first location of the subject by computing a first center point of the subject in the first subset of the image data. The system may identify the subject in a second subset of the image data at a second time after the first time (e.g., image data from cameras in space 1, 2, 3, and/or 4 at a later time). The system may determine a second location of the subject by computing a second center point of the subject in the second subset of the image data. For example, the system may compute a center point of the subject by any suitable method for finding a centroid of a figure (e.g., representing subject as a collection of points in a plane or solid figure, and finding the arithmetic mean position of all the points in the surface of the figure). The system may determine a velocity vector of the subject based on the first location, the second location, the first time, and the second time. The system may multiply the velocity vector by a time period to determine the estimated location of the subject. In this way, the system may estimate the location of the subject at a future time (current time plus a time period). The estimated location of the subject may be in an adjacent space, and the system may prefetch low-bitrate bitstreams from adjacent space(s) prior to the subject moving to the adjacent space(s).

Figure 3:
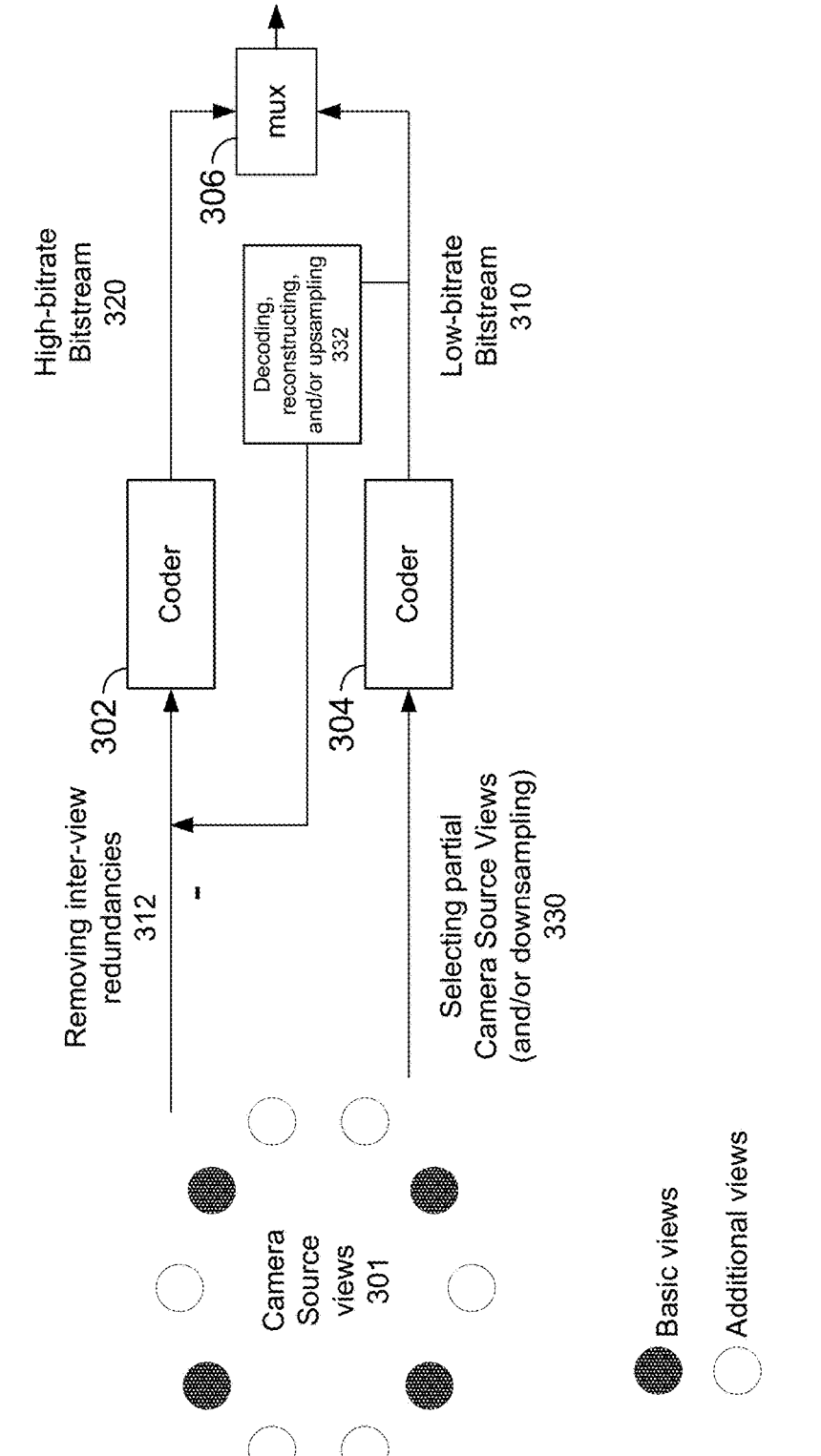
FIG. 3 shows an illustrative example of a multi-pass coding method, in accordance with some embodiments of this disclosure.
Figure 4:
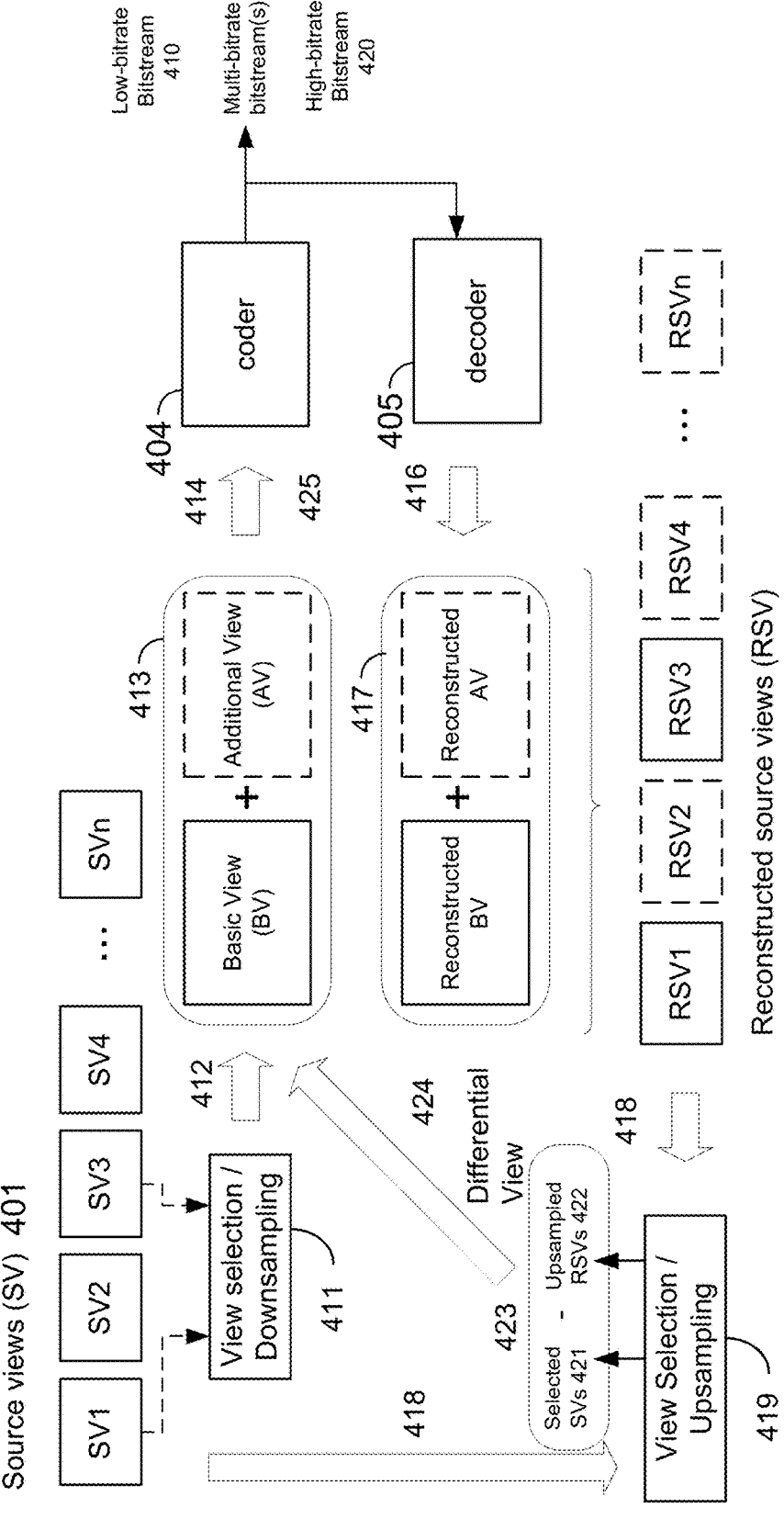
FIG. 4 shows an illustrative example of detailed procedures for a multi-pass coding, in accordance with some embodiments of this disclosure.

FIG. 3 shows an illustrative example of a multi-pass coding method, in accordance with some embodiments of this disclosure. FIG. 3 shows a conceptual diagram 300 including camera source views, coders, and bitstreams. Although FIG. 3 shows two separate coders (e.g., coders 302 and 304), in some embodiments, coder 302 and coder 304 may be a same coder and work as multi-pass coding. For example, FIG. 4 shows an embodiment where there is one coder 404 instead of two coders 302 and 304 that works using multi-pass coding. In some embodiments, the coders 302 and coders 304 may be MIV coders. FIG. 3 shows ten camera source views 301 with four basic views and six additional views; however in other embodiments, any suitable number of camera views may be used (e.g., 10, 30, etc.) with different division of basic views and additional views. Although camera source views 301 are shown in a circular arrangement in FIG. 3 and other figures in this disclosure, in other embodiments, any suitable arrangement of cameras may be used (e.g., semicircular, rectangular, linear, etc.).

The system may partially select and/or downsample 330 original camera views (e.g., camera source views 301) to be encoded for the low-bitrate bitstream 310. In some embodiments, partial selection of an original camera view includes selecting a sub-group of cameras from a group of cameras associated with a virtual space. The sub-group of cameras may be partially selected based on an estimated location of a subject, and image data of a view of each camera may include a portion of the environment at the estimated location of the subject. For example, a sub-group of cameras from a space may be selected based on image data of each camera's view including a portion of the environment at the estimated location of the subject. In some embodiments, the subject is included in the environment, and the portion of the environment at the estimated location of the subject may include a portion of the subject. In some embodiments, the system may estimate the location of the subject based on identifying the subject in image data of respective views of cameras and determining a centroid of subject (e.g., estimated location of the subject is at a center point of the subject). In some embodiments, the estimated location of the subject may be a predicted location of the subject (e.g., subject is not identified at the location, but is predicted to be at a later time). The coder 304 may code the partially selected and/or downsampled camera source views 330. The system may code the partial camera source views to generate a low-bitrate bitstream 310. The low-bitrate bitstream 310 may be decoded, reconstructed, and/or upsampled at 332 to make an enhancement layer (e.g., like the enhancement layer in scalable video coding). In some embodiments, reconstruction of the decoded bitstream includes processing the decoded bitstream to a suitable format (e.g., a suitable format for upsampling to make an enhancement layer, a suitable format to make an enhancement layer). Inter-view redundancies may be removed 312 by subtracting the decoded, reconstructed and/or upsampled low bit-rate bitstream from the original camera source views. The difference information (views) 312 between original camera source views and the reconstructed and/or upsampled views may be encoded for high-bitrate bitstream 320 by coder 302. In some embodiments, the two bitstreams may be multiplexed. For example, the high-bitrate bitstream 310 and the low-bitrate bitstream 320 may be input to a mux 306, and the mux may be used to select a bitstream. In some embodiments, although not shown in FIG. 3, mux 306 may receive an input that selects one of the bitstreams. In some embodiments, the mux 306 may select an appropriate bitstream for transmission to a client device. For example, a low-bitrate bitstream 320 may be selected to send selected views from a selected sub-group of cameras for an intermediate space, and a high-bitrate bitstream 310 may be selected to send views (e.g., difference information) for all source views from all cameras in a space. In some embodiments, mux 306 may select an appropriate bitstream for file storing.

FIG. 4 shows an illustrative example of detailed procedures for a multi-pass coding, in accordance with some embodiments of this disclosure. In some embodiments, any suitable coding software may be used (e.g., immersive video software). For example, the multi-pass coding may use MPEG-Immersive TMIV software (Test Model of MPEG immersive video software). In some embodiments, the source views (SV) 401 (e.g., SV1, SV2 . . . SVn) in FIG. 4 correspond to (e.g., is similar to, the same as) camera source views 301 in FIG. 3. In some embodiments, the low-bitrate bitstream 410 and the high-bitrate bitstream 420 of FIG. 4 may correspond to (e.g., is similar to, the same as) low-bitrate bitstream 310 and high-bitrate bitstream 330, respectively, in FIG. 3.

The system may use different options for the low-bitrate bitstream 410. A system may generate the low-bitrate bitstream from (1) downsampled partial source views, (2) downsampled basic views without additional views, or (3) downsampled all source views (e.g., all basic views and additional views). In some embodiments downsampling is optional. For example, the system may generate the low-bitrate bitstream from partial source views, basic views without additional views, or all source views.

In some embodiments, partial source views are a selection of source views which may include one or more basic views and one or more additional views from all source views. A basic view may be calculated and selected by using the view optimizer in an MIV system and may be a view from a camera that covers a large area. An additional view may be a view from the other cameras. In some embodiments, a basic view is calculated and selected using any suitable technique (e.g., view optimizer) from any suitable system (e.g., coding system, standard coding system). All source views may be all the views from cameras associated with a space in the environment. In one embodiment, all source views may be cameras associated with a space in the environment. For example, the system may select SV1 and SV3 from all source views 401 (e.g., SV1, SV2, . . . SVn) for a space in the environment. Although two source views, SV1 and SV3, are shown in FIG. 4 to be selected, any suitable number of source views may be selected (e.g., 4, etc.). For example, each source view SV1, SV2, . . . SVn may be provided a corresponding camera (1, 2, . . . *n*) for a space in the environment, each camera providing image data of respective views of the space in the environment.

In some embodiments, the system generates the low-bitrate bitstream 410 from (1) downsampled partial source views. For example, in FIG. 4, a system 400 may select and/or downsample 411 from source views (SV) 401 (e.g., SV1, SV2, . . . SVn). In the example shown in FIG. 4, the system may select SV1 and SV3 from all source views 401 (e.g., SV1, SV2, . . . SVn). The all source views 401 may be views for cameras associated with a space in the environment.

As an example, FIG. 4 shows source views 401 (e.g., SV1, SV2, . . . SVn) for view selection/downsampling. For example, arrows from SV1 and SV3 input to view selection/downsampling block 411 may indicate the selected views are SV1 and SV3 from the source views 401, which are downsampled. At step 412, the output of the view selection/downsampling block 411 (e.g., downsampled selected source views SV1 and SV3) may be represented by a basic view (BV) and an additional view (AV) 413. For example, source view SV1 may be a basic view (BV) and source view SV3 may be an additional view (AV), which are downsampled. For simplicity, only one basic view (BV) and one additional view (AV) 413 are shown in FIG. 4, but in some embodiments, there may be multiple BVs and/or multiple AVs. At step 414, the downsampled BV and AV 413 are provided as input to a coder 404. In some embodiments, the coder 404 is a TMIV coder. The system (e.g., using coder 404) may code the downsampled BV and AV 413. The output of coder 404 (e.g., coded, downsampled BV and AV) may be a low-bitrate bitstream 410.

In some embodiments, the system generates the low-bitrate bitstream 410 from partial source views that are not downsampled. The system may generate the low-bitrate bitstream 410 by coding the partial source views (e.g., by coder 404).

In some embodiments, the system generates the high-bitrate bitstream 420 from the difference between the all source views and the reconstructed source views. For example, the system 400 may generate a high-bitrate bitstream 420 by subtracting 423 reconstructed and/or upsampled views (e.g., partial source views, RSV1 and RSV3) 422 from selected source views (e.g., SV1 to SVn) 421.

In some embodiments, the system may generate reconstructed source views by decoding the low-bitrate bitstream 410. As an example, FIG. 4 shows the low-bitrate bitstream

410 may be the input to the decoder 405. In some embodiments, decoder 405 may be a TMIV decoder. The system (e.g., using decoder 405) may reconstruct SV1 and SV3 by decoding the coded downsampled BV and AV. At step 416, the output of the decoder 405 may be represented as reconstructed source view (RSV) of reconstructed BV and reconstructed AV 417 (e.g., RSV1 and RSV3). For simplicity, only one reconstructed basic view (BV) and one reconstructed additional view (AV) 417 are shown in FIG. 4, but in some embodiments, there may be multiple reconstructed BVs and/or multiple reconstructed A Vs. For illustrative purposes, FIG. 4 shows all reconstructed source views (e.g., RSV1, RSV2, to RSVn) which may be generated from all sources, but for purposes of this example, RSV1 and RSV3 are generated from decoder 405, and the remaining reconstructed source views (e.g., RSV2, RSV4, . . . . RSVn) may be optional.

In some embodiments, the system may generate the high-bitrate bitstream from the difference between the all source views and the reconstructed and/or upsampled source views (e.g., partial source views). For example, the system may reconstruct the partial source views (e.g., decode the coded downsampled SV1 and SV3) and upsample the reconstructed partial source views (e.g., upsample RSV1 and RSV3). The system may subtract the reconstructed and/or upsampled views (e.g., upsampled RSV1 and RSV3) from the all source views (e.g., SV1, SV2, . . . SVn). The system may code the difference as the high-bitrate bitstream. As an example, FIG. 4 shows, at step 418, the source views are input to view selection/upsampling block 419. In some embodiments, the source views (e.g., SV1 and SV3) may be selected from the source views (e.g., SV1, SV2, . . . SVn). For simplicity, the arrows from SV1 and SV3 are not shown as inputs to the view selection/upsampling block 419 (e.g., to indicate the selected views 421) at step 418. In some embodiments, the view selection/upsampling block 419 is a basic view selection/upsampling block, and may be used to select basic views. In some embodiments, the view selection/upsampling block 419 may select all source views SV1 . . . SVn. The output of the view selection/upsampling block 419 may be the selected source views 421.

At step 418, the reconstructed source views RSV1 and RSV3 may be input to a view selection/upsampling block 419 to be upsampled (e.g., to generate upsampled RSV1 and upsampled RSV3 422). The output of the view selection/upsampling block 419 may be upsampled RSVs 422 (e.g., upsampled RSV1 and upsampled RSV2).

At step 423, the upsampled RSV1 and upsampled RSV3 422 may be subtracted from the selected source views 421 (e.g., SV1 and SV3, all source views SV1 . . . SVn, etc.) to generate a differential view 424. The differential view 424 may be input 425 to coder 404, and the output of coder 404 (e.g., coded differential view) may be a high-bitrate bitstream 420.

In some embodiments, the output of the coder 404 may be multi-bitrate bitstreams. For example, the output of coder 404 from input at step 414 is a low-bitrate bitstream 410, and the output of coder 404 from input at step 425 is a high bit-rate bitstream 420. In some embodiments, the system may use 2-dimensional texture information without depth (geometry) information.

In some embodiments, the system generates the low-bitrate bitstream 410 from (2) (downsampled) basic views without additional views. For example, FIG. 4 shows additional views 413 are optional, and the system may select and/or downsample 411 SV1 and SV3 which may correspond to only basic views 413. The system may reconstruct (e.g., using decoder 405) and/or upsample (e.g., using view selection/upsampling block 419) the basic views to be subtracted 423 from the originally selected basic views SV1 and SV3 and pruned from the other original source views SV2, SV4 . . . SVn in the encoder. In some embodiments, the system generates the high-bitrate bitstream 420 by removing the originally selected source views SV1 and SV3 for encoding the high-bitrate bitstream. In some embodiments, the system selects all the basic views without additional views. In some embodiments, the system selects one or more of the basic views without additional views. For example, the system may select (e.g., view selection/downsampling block 411) SV1 and SV3 from all source views (e.g., SV1, SV2, . . . SVn). In some embodiments, SV1 and SV3 may both be basic views, and no additional views are selected. The system may downsample (e.g., view selection/downsampling block 411) the selected basic views. The system may generate the low-bitrate bitstream 410 by coding the downsampled selected basic views 413. For example, the downsampled selected basic views 413 are input 414 to a coder 404 to generate the low bitrate bitstream 410. The system may reconstruct and/or upsample SV1 and SV3 (e.g., from the low bitrate bitstream 410). For example, the system may reconstruct (e.g., via decoder 405, outputting 416 reconstructed BVs 417) and upsample (e.g., via view selection/upsampling block 419) RSV1 and RSV3 (e.g., upsampled RSV1 and RSV3 422). At step 418, the system may select the originally selected source views. The system may subtract 423 the upsampled RSV1 and RSV3 422 from the originally selected source views 421 (e.g., SV1, SV3). The system may prune the upsampled RSV1 and RSV3 from other original source views in the encoder (e.g., SV2, SV4, . . . . SVn). For example, the system may remove portions of redundant data from upsampled RSV1 and RSV3 from other original source views. In some embodiments, the system may generate the high-bitrate bitstream by dropping (e.g., removing) SV1 and SV3 for encoding the high-bitrate bitstream. The system may code the other original source views that were pruned (and not removed).

In one embodiment, the system uses downsampled all source views for the low-bitrate bitstream. In case of (3), all reconstructed and upsampled views are subtracted from the original source views, and the differential information is coded with coder. For example, the system may use all source views (e.g., SV1, SV2, . . . SVn), downsample all source views, and generate the low-bitrate bitstream 410 by coding the downsampled all source views 413. For example, in FIG. 4 the selection of SV1 and SV3 by view selection/downsampling block 411 may be optional, and the view selection/downsampling block 411 may select all source views 401. The system may reconstruct the source views (e.g., as reconstructed BVs and AVs 417) and upsample (e.g., via view selection/upsampling block 419) the reconstructed source views (e.g., as upsampled RSVs 422). For example, the system may decode (e.g., via the decoder 405) the coded downsampled all source views to generate reconstructed views (e.g., RSV1, RSV2, . . . RSVn). The system may upsample (using view selection/upsampling block 419) the reconstructed views (e.g., upsample RSV1, RSV2, . . . RSVn). The system may subtract 423 all reconstructed and upsampled views 422 from the original source views 421 (e.g., all source views 401 selected by view selection/upsampling block 419), and code the difference 424 as the high-bitrate bitstream 420.

In some embodiments, the multi-pass coding may use 2-dimentional texture information without depth (geometry) information. For example, the depth (geometry) information of the low-bitrate bitstream input and high-bitrate bitstream input may be similar (e.g., the same, almost the same, approximately the same) and the system may use down-sampled depth (geometry) views.

In some embodiments, a system may enable multi-pass coding for generating multi-bitrate bitstreams while remov-ing view redundancies. For example, the system (e.g., using an immersive video application) may generate a low-bitrate bitstream 410 based on image data of respective source views of a space captured by one or more selected cameras of a plurality of cameras associated with the space. In some embodiments, the one or more selected cameras may be a partial selection of cameras in a space. For example, a space may have ten cameras associated with the space, and one or more of the cameras in a space may be selected as a partial camera source views of the space (e.g., 1, 2, 3, etc., or any suitable number of cameras). In some embodiments, the one or more selected cameras may be all of the cameras in a space, and the source views of the cameras may be down-sampled. The system may generate a high-bitrate bitstream 420 based on difference image data 424. The difference image data may be based on image data of respective source views of the space captured by the plurality of cameras and reconstructed image data based on the low-bitrate bitstream. This helps to address the problem of virtual space traversing latency by partially selecting and/or downsampling original camera source views in a space to reduce the latency and required bandwidth.

In some embodiments, the system may select the high-bitrate bitstream or the low-bitrate bitstream for transmis-sion to a client device. For example, the system may use a mux to select a bitstream for transmission to a client device. In some embodiments, the system may generate the recon-structed image data by decoding and reconstructing the low-bitrate bitstream. The reconstructed image data may be the reconstructed decoded low-bitrate bitstream. In some embodiments, the system may downsample the image data of the respective source views of the space captured by the one or more selected cameras. The system may generate the low-bitrate bitstream based on the downsampled image data. The system may generate the reconstructed image data by decoding, reconstructing, and upsampling the low-bitrate bitstream. The reconstructed image data may be the upsampled reconstructed decoded low-bitrate bitstream.

In some embodiments, each of the respective source views of the space captured by the plurality of cameras is a basic view type or an additional view type. Each basic view type may cover a larger region of the space than each additional view type. Each of the respective source views of the space captured by the one or more selected cameras may be the basic view type. In some embodiments, the one or more selected cameras are the plurality of cameras. The system may downsample the image data of respective source views of the space captured by the plurality of cameras associated with the space. In some embodiments, generating the low-bitrate bitstream is based on the downsampled image data. In some embodiments, the system generates the reconstructed image data by decoding, reconstructing, and upsampling the low-bitrate bitstream. In some embodi-ments, the reconstructed image data is the upsampled recon-structed decoded low-bitrate bitstream.

Figure 5:
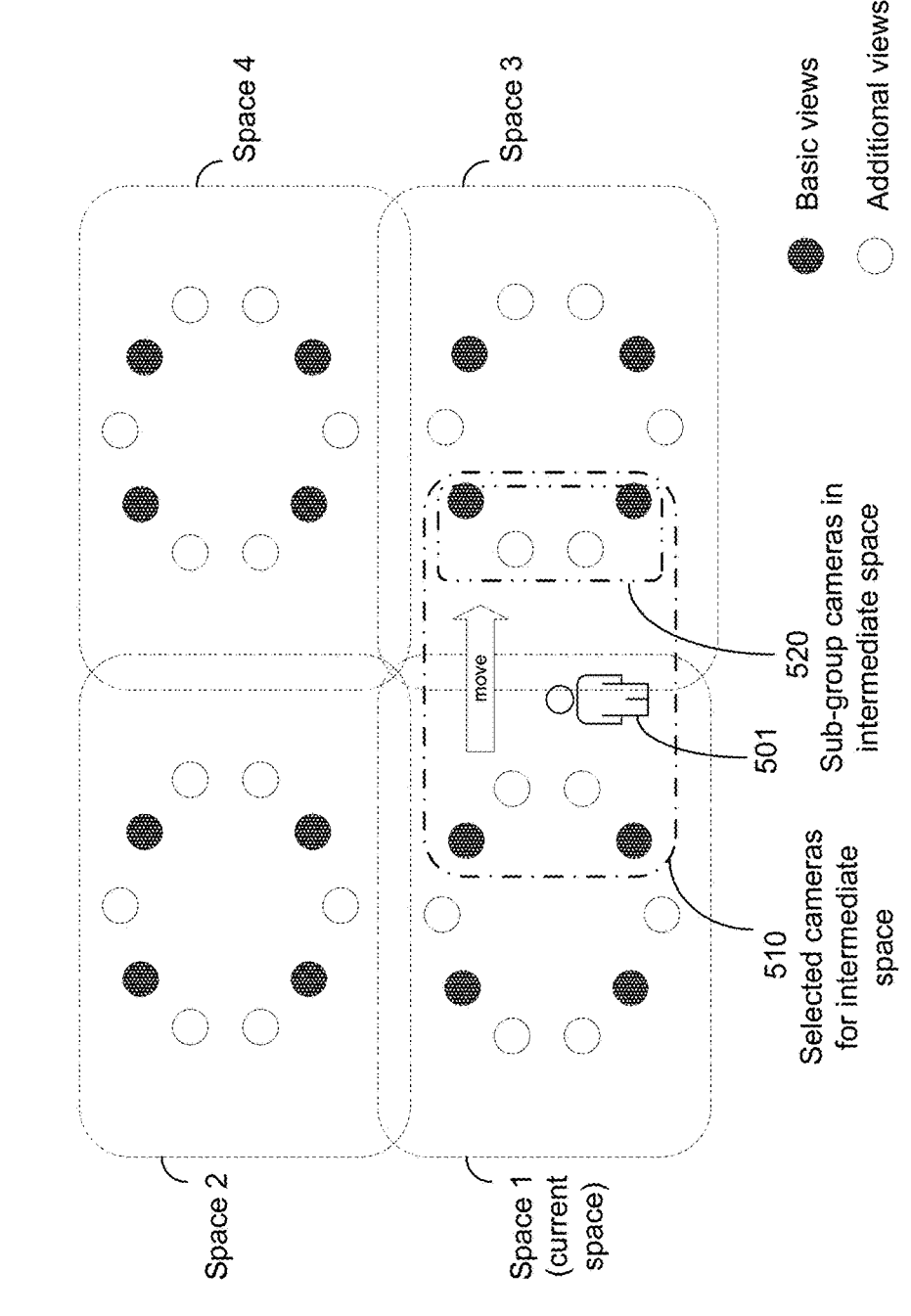
FIG. 5 shows an illustrative example of subject movement in an intermediate space with cameras, in accordance with some embodiments of this disclosure.

FIG. 5 shows an illustrative example of subject movement in an intermediate space with cameras, in accordance with some embodiments of this disclosure. When a subject 501 moves from one space to another (e.g., space 1 to space 3), several cameras 510 may be within an intermediate space (area) in the middle of user movement. In some embodiments, systems and methods may prepare the encoded contents, decode, and render the views according to the user position (movement). The system may (1) pre-encoded bitstreams on the server side, (2) decode real-time encoded bitstreams on the client side, and (3) synthesize a real-time view on the client side. A pre-encoded bitstream may be an encoded bitstream in advance compared to real-time encod-ing. This helps to address the problem of the XR system not providing virtual views at the intermediate space.

In some embodiments, systems and methods provide (1) sub-camera group bitstreams and (2) inter-space pruning. In separated spaces, one or more from each space may have view redundancies with each other according to their camera coordination. In some embodiments, inter-space pruning may be optional. In some embodiments, the system may perform inter-space pruning if high bitrate reduction is expected. For example, the system may perform inter-space pruning if there are more than a threshold number of cameras associated with the intermediate space. The thresh-old number of cameras may be based on a size of the intermediate space, the type of camera used, etc. For example, if 360 degree cameras are used in the intermediate space, the threshold number of cameras may be smaller than if 2D perspective cameras are used. Although FIG. 5 shows eight cameras are selected in an intermediate space, there may be more cameras, such as 15-25 cameras, 48 cameras, or any suitable number of cameras. In the example of 48 cameras, the interview redundancy reduction using pruning may be high. In some embodiments, the system may prepare adjacent sub-camera bitstreams at the encoding time.

FIG. 5 shows subject 501 movement in an intermediate space (e.g., space in a middle area of space 1 and space 3). The system selects eight cameras 510 for the intermediate space. The left four cameras may have been encoded as a bitstream for space 1, and the right four cameras (e.g., sub-group cameras 520 in intermediate space) may be for space 3. Although FIG. 5 shows eight cameras as being selected, in some embodiments, any suitable number of cameras may be selected for the intermediate space. In one approach, before decoding both (e.g., MIV) bitstreams (in the example, 20 cameras, e.g., 10 cameras for space 1 and 10 cameras for space 3), the eight selected cameras cannot generate virtual views (e.g., a reference view synthesizer (RVS) cannot be used). In some embodiments, systems and method provide coding for additional sub-group (camera) views at intermediate space. For example, additional sub-group cameras (e.g., sub-group cameras 520) may be pro-cessed as an intermediate bitstream separately in advance. Then, at the intermediate space, the 8 selected cameras 510 may generate virtual views after decoding the intermediate bitstream because the left four cameras (in the intermediate space in space 1) may have already been decoded when subject was in space 1.

In some embodiments, a system may use source cameras surrounding the subject for generating intermediate views. For example, partial sub-group cameras can be encoded independently. In some embodiments, a number of cameras to north, east, west, and south-bound spaces (e.g., of a current space including the subject) can be encoded in advance.

Figure 6A:
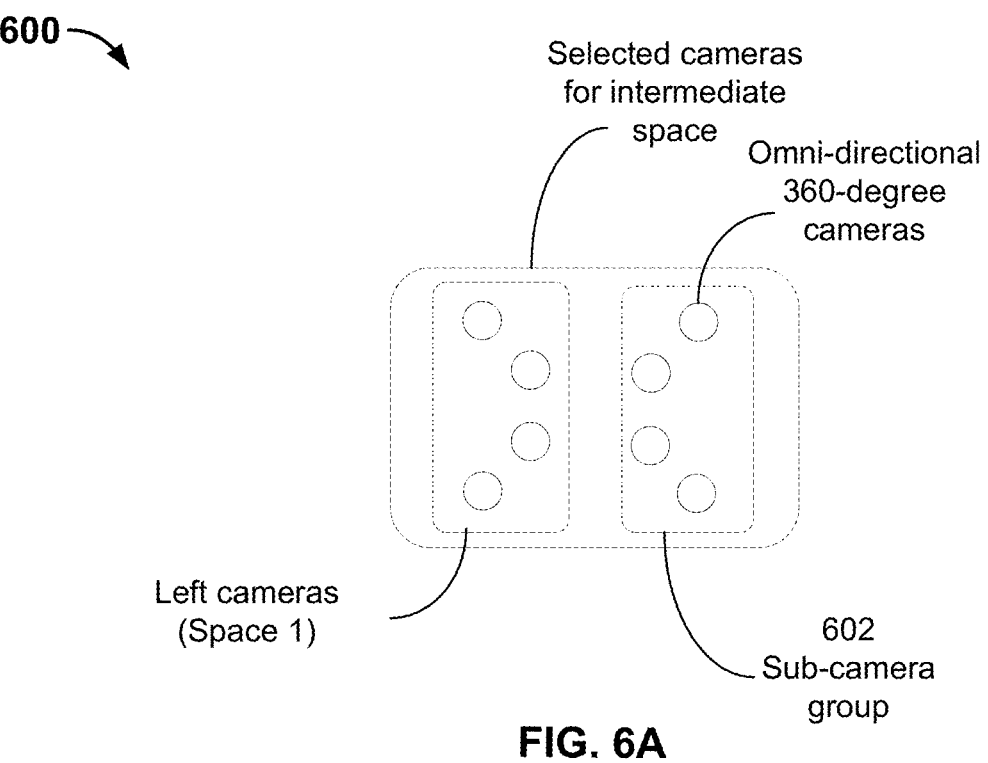
FIG. 6A shows an illustrative example of omni-directional cameras in an intermediate space, in accordance with some embodiments of this disclosure.
Figure 6B:
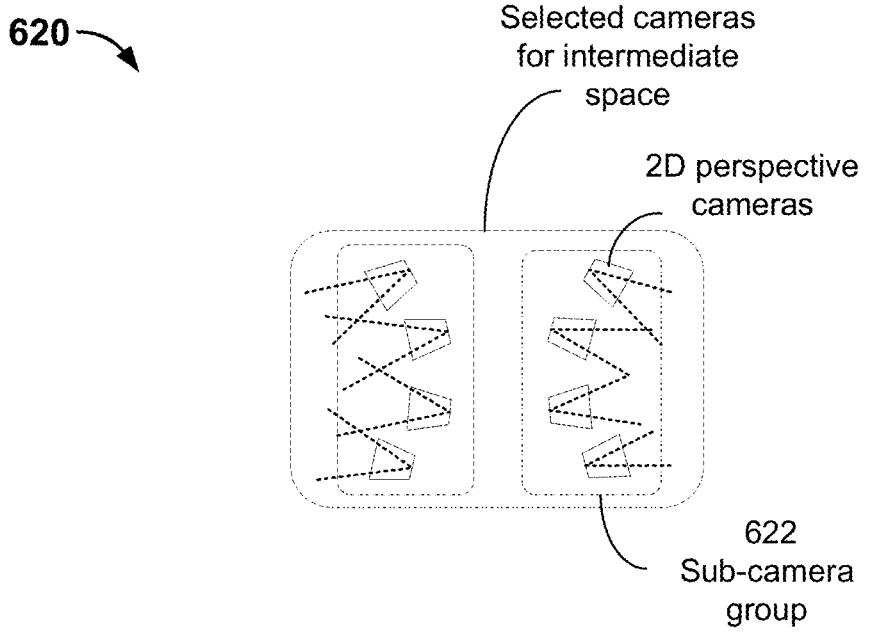
FIG. 6B shows an illustrative example of 2D perspective cameras in an intermediate space, in accordance with some embodiments of this disclosure.

FIG. 6A shows an illustrative example of omni-direc-tional cameras, in accordance with some embodiments of this disclosure. FIG. 6B shows an illustrative example of 2D perspective cameras, in accordance with some embodiments of this disclosure. In some embodiments, the cameras shown in FIGS. 6A and 6B correspond to (e.g., are similar to, the same as) the selected cameras 510 for intermediate space of FIG. 5. For example, similar to the selected cameras 510 for intermediate space of FIG. 5, there are four cameras on the left and four cameras on the right.

In some embodiments, four cameras on the right of FIGS. 6A and 6B may correspond to (e.g., are similar to, the same as) a sub-group 520 of cameras in the intermediate space of FIG. 5. The four cameras on the left may represent cameras from space 1. The four cameras on the right may represent cameras from space 3. In some embodiments, inter-space pruning may be performed differently with two types of cameras (a) 360-degree cameras and (b) 2D perspective cameras.

In FIG. 6A, 360-degree cameras captures the omnidirectional video. The system may perform a pruning process with 8 cameras. In some embodiments, the higher inter-view redundancy of the omnidirectional cameras may result in BD-rate (Bjontegaard delta rate) gain from interspace pruning. In some embodiments, the system may prefetch the sub-camera group bitstream to lower the latency. The inter-space pruning may provide (1) low bitrate bitstream and (2) lesser latency.

In FIG. 6B, eight 2D perspective cameras may be used. In the camera coordination, the bitrate gain from the inter-space pruning may not be high because of low interview redundancies. In some embodiments, in the camera coordination, the system may skip the inter-space pruning. In some embodiments, the system may provide the sub-camera group bitstream (e.g., prefetching), to lower the latency for space traversing. For example, the system may transmit MIV bitstream from right four cameras instead of all cameras in the space (e.g., space 3), and this may decrease the space traversing latency significantly.

When a subject is located between two sub-camera groups, the inter-view redundancies may be different with each other. FIG. 6A, having 360-degree cameras, may show higher inter-view redundancy, which may have a higher BD-rate gain from the inter-space pruning. FIG. 6B, having 2D perspective cameras, may not show high bit-rate gain because of lesser inter-view redundancy, but may show lesser latency by prefetching the sub-camera group bitstream. In some embodiments, the subject located in the middle of intermediate space may be captured even though 2D perspective cameras are used. For example, the subject may jump to a new space when the subject is heading to the edge of the previous space. In some embodiments, the system may use an application service to implement this type of solution.

Figure 7:
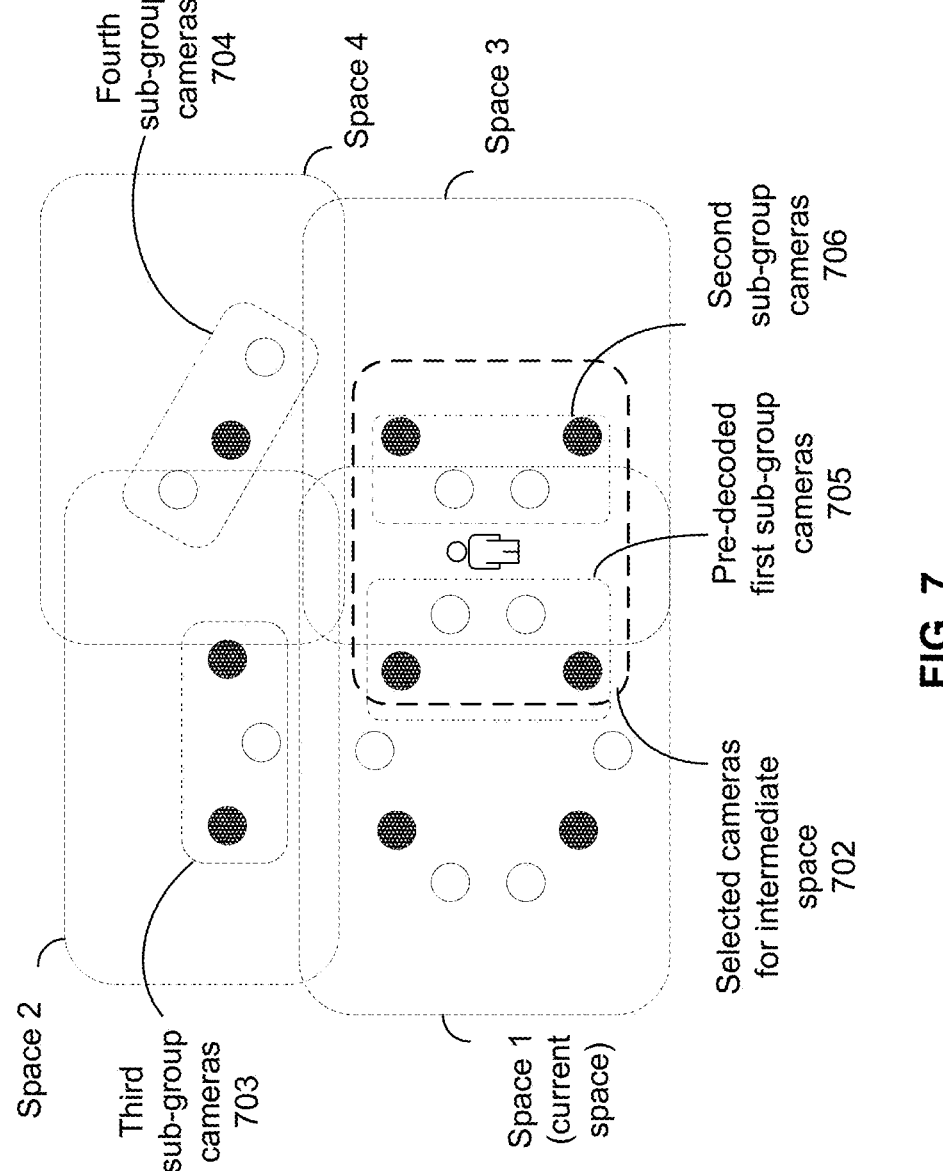
FIG. 7 shows an illustrative example of additional camera bitstream coding for intermediate space considering subject movement and viewport direction, in accordance with some embodiments of this disclosure.

FIG. 7 shows an illustrative example of additional camera bitstream coding for intermediate space considering subject movement and viewport direction, in accordance with some embodiments of this disclosure. FIG. 7 may show the preparation of the additional camera bitstreams for intermediate spaces. For example, a subject may be in an intermediate space. The subject may be moving from space 1 to space 3, and may be in a space in the middle of or between space 1 and space 3. In FIG. 7, there are eight selected cameras 702 for the intermediate space. For example, a system may select four of the cameras to the left of the subject from space 1 (e.g., first sub-group of cameras 705), and four cameras to the right of the subject from space 3 (second sub-group of cameras 706). The respective views from each camera of the first sub-group of cameras of 705 and the second sub-group of cameras of 706 may include at least a portion of the subject. A first sub-group of cameras 705 (e.g., four cameras to the left of the subject) may be a pre-decoded sub-group of cameras at an intermediate area in a current space. For example, a client device may have decoded a bitstream for the cameras in space 1 from when the subject was in space 1. The bitstream for the cameras in space 1 may include image data of views from the first sub-group of cameras 705, and the client device may have decoded the bitstreams including the image data of the views from the first sub-group of cameras 705 (e.g., pre-decoded first sub-group cameras 705). A second sub-group of cameras 706 (e.g., four cameras to the right of the subject) may be selected for the intermediate space. For example, a system may receive image data of views from the second sub-group of cameras 706 and transmit bitstreams including image data from the views of the second sub-group of cameras 706 to the client device. In some embodiments, a third sub-group of cameras 703 and a fourth sub-group of cameras 704 from adjacent spaces 2 and 4 may be selected. For example, system may determine that the subject is facing a direction in adjacent spaces 2 and 4, and may select cameras from the adjacent space 2 and 4. The system may receive image data of views from the third and fourth sub-groups of cameras 703 and 704, and may transmit bitstreams including the image data of the views of the selected cameras to the client device.

In FIG. 7, the required bandwidth for additional camera bitstream may be an overhead. However, the overhead may be reduced or minimized if the number of additional sub-group cameras are well-optimized considering virtual view qualities. In some embodiments, (1) subject movement direction and (2) camera coordination may be used for the seamless space transition.

Figure 8:
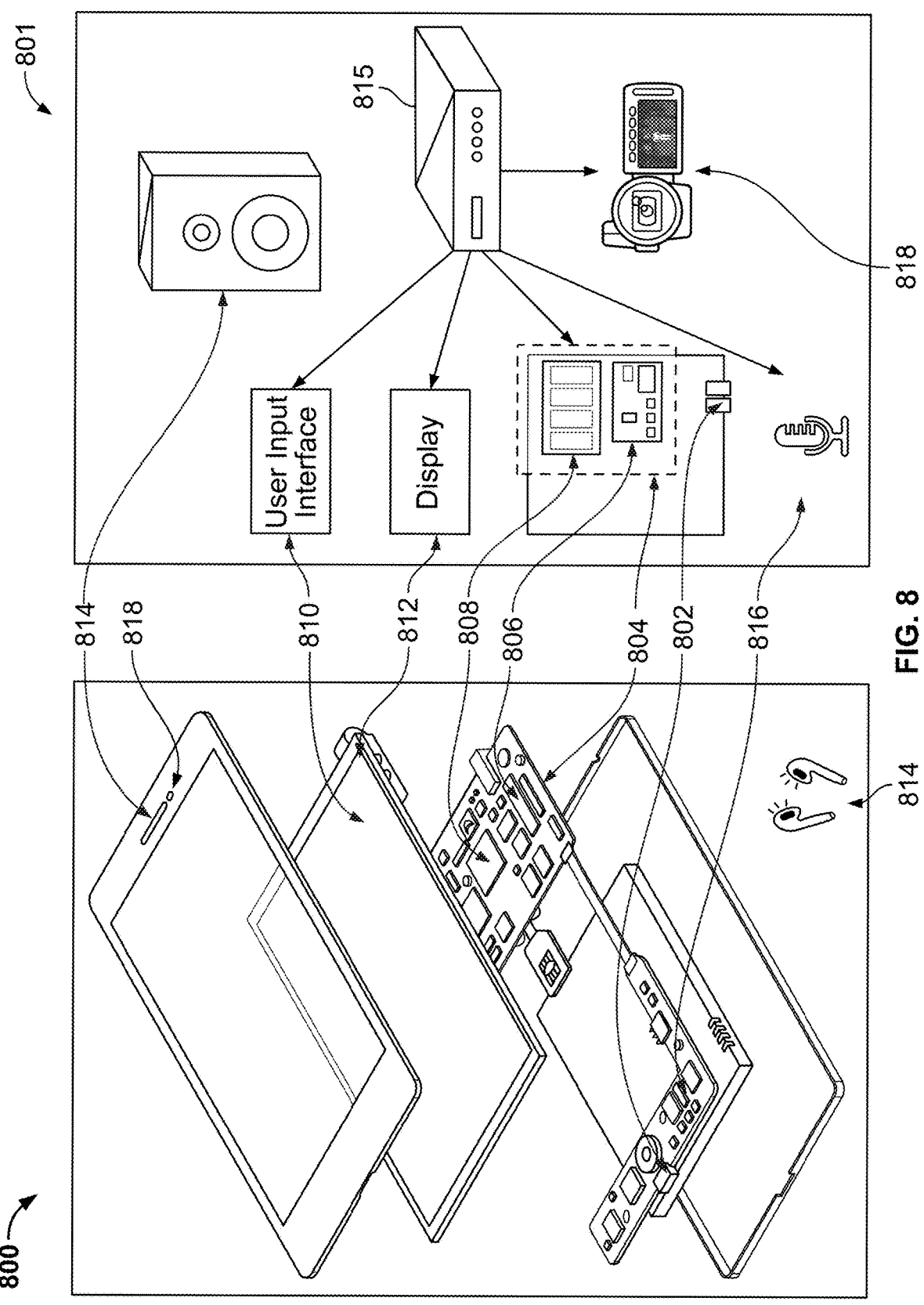
FIG. 8 shows an illustrative user equipment device, in accordance with some embodiments of this disclosure.
Figure 9:
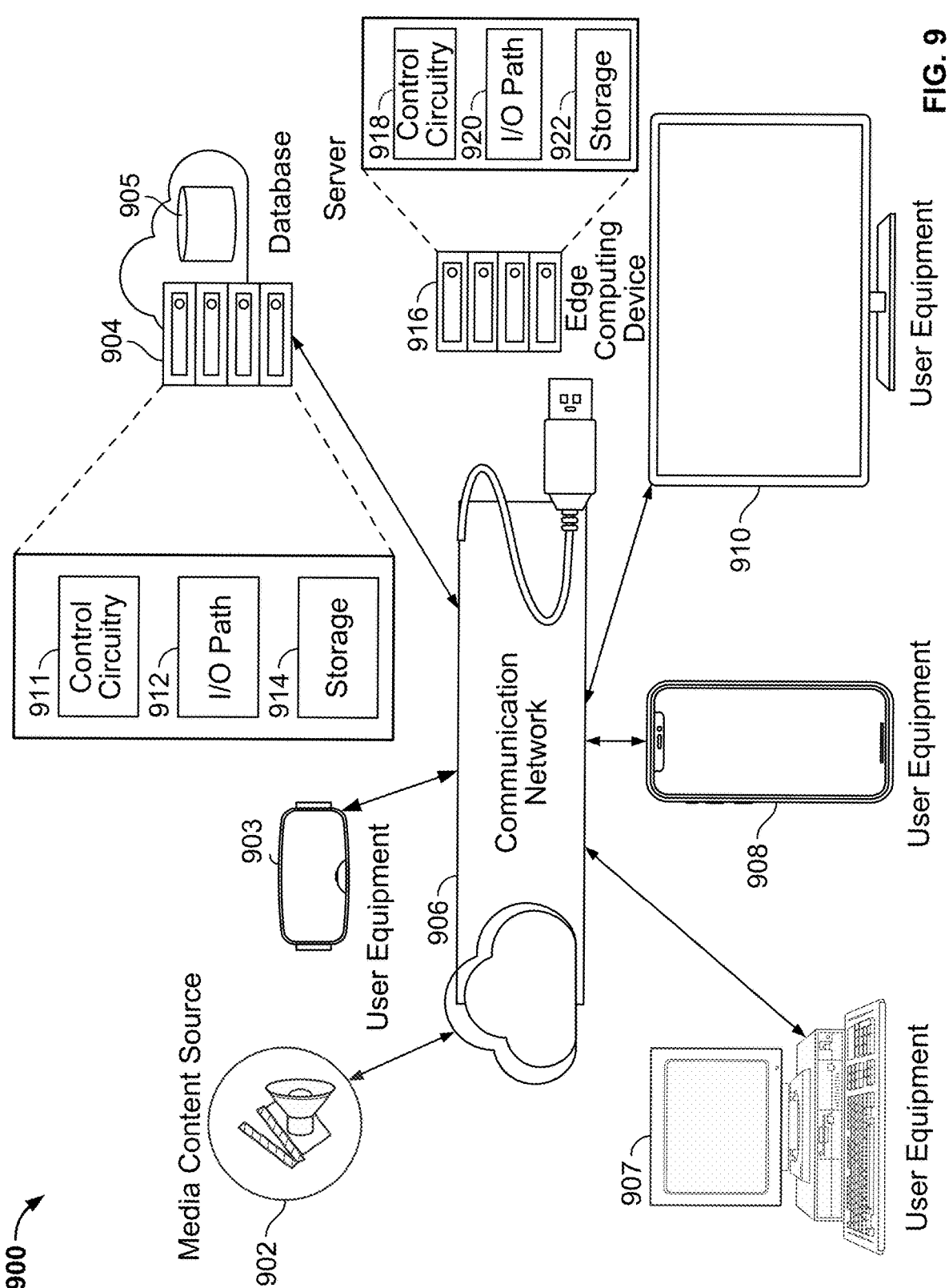
FIG. 9 shows an example system, in accordance with some embodiments of this disclosure.

FIGS. 8-9 depict illustrative devices, systems, servers, and related hardware for enabling seamless interspace traversing by camera selection, generating multi-rate bitstreams, multi-rate coding, and interspace pruning. FIG. 8 shows generalized embodiments of illustrative user equipment devices 800 and 801, any one of which may represent an example of client device 150 shown in FIG. 1. The server shown in FIG. 9 may represent an example of server 102 shown in FIG. 1 in an embodiment. For example, user equipment device 800 may be a smartphone device, a tablet, a virtual reality or augmented reality device, or any other suitable device capable of processing video data. In another example, user equipment device 801 may be a user television equipment system or device. User television equipment device 801 may include set-top box 815. Set-top box 815 may be communicatively connected to microphone 816, audio output equipment (e.g., speaker or headphones 814), and display 812. In some embodiments, display 812 may be a television display or a computer display. In some embodiments, display 812 may be a display in an HMD or an XR device. In some embodiments, set-top box 815 may be communicatively connected to user input interface 810. In some embodiments, user input interface 810 may be a remote-control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 800 and user equipment device 801 may receive content and data via input/output (I/O) path (e.g., circuitry) 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 8 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone (e.g., device 800), a tablet, a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for the immersive video application stored in memory (e.g., storage 808). Specifically, control circuitry 804 may be instructed by the immersive video application to perform the functions discussed above and below. In some implementations, processing or actions performed by control circuitry 804 may be based on instructions received from the immersive video application.

In client/server-based embodiments, control circuitry 804 may include communications circuitry suitable for communicating with a server or other networks or servers. The immersive video application may be a stand-alone application implemented on a device or a server. The immersive video application may be implemented as software or a set of executable instructions. The instructions for performing any of the embodiments discussed herein of the immersive video application may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a device 800.

In some embodiments, the immersive video application may be a client/server application where only the client application resides on device 800, and a server application resides on an external server (e.g., server 904 and/or server 916). For example, the immersive video application may be implemented partially as a client application on control circuitry 804 of device 800 and partially on server 904 as a server application running on control circuitry 911. Server 904 may be a part of a local area network with one or more of devices 800 or may be part of a cloud computing environment accessed via the internet. In a cloud computing environment, various types of computing services for performing searches on the internet or informational databases, providing seamless virtual space traversing capabilities, providing storage (e.g., for a database) or parsing data (e.g., using machine learning algorithms) are provided by a collection of network-accessible computing and storage resources (e.g., server 904 and/or edge computing device 916), referred to as "the cloud." Device 800 may be a cloud client that relies on the cloud computing capabilities from server 904 to determine whether processing (e.g., at least a portion of virtual background processing and/or at least a portion of other processing tasks) should be offloaded from the mobile device, and facilitate such offloading. When executed by control circuitry of server 904 or 916, the immersive video application may instruct control circuitry 911 or 918 to perform processing tasks for the client device and facilitate the seamless virtual space traversing.

Control circuitry 804 may include communications circuitry suitable for communicating with a server, edge computing systems and devices, a table or database server, or other networks or servers. The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as immersive video application data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of user equipment 800. Control circuitry 804 may also include digital-to-analog converter circuitry and analog-to-digital converter circuitry for converting between digital and analog signals. The tuning and encoding circuitry may be used by user equipment device 800, 801 to receive and to display, to play, or to record content. The tuning and encoding circuitry may also be used to receive video data for seamless interspace traversing. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of user equipment device 800 and user equipment device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and equipment 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

The immersive video application may be implemented using any suitable architecture. For example, it may be a stand-alone application wholly-implemented on each one of user equipment device 800 and user equipment device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide seamless interspace traversing functionality and perform any of the actions discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the immersive video application is a client/server-based application. Data for use by a thick or thin client implemented on each one of user equipment device 800 and user equipment device 801 may be retrieved on-demand by issuing requests to a server remote to each one of user equipment device 800 and user equipment device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays. For example, device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to device 800 for presentation to the user.

In some embodiments, the immersive video application may be downloaded and interpreted or otherwise run by an interpreter or virtual machine (run by control circuitry 804). In some embodiments, the immersive video application may be encoded in the ETV Binary Interchange Format (EBIF), received by control circuitry 804 as part of a suitable feed, and interpreted by a user agent running on control circuitry 804. For example, the immersive video application may be an EBIF application. In some embodiments, the immersive video application may be defined by a series of JAVA-based files that are received and run by a local virtual machine or other suitable middleware executed by control circuitry 804. In some of such embodiments (e.g., those employing MPEG-2 or other digital media encoding schemes), immersive video application may be, for example, encoded and transmitted in an MPEG-2 object carousel with the MPEG audio and video packets of a program.

FIG. 9 is a diagram of an illustrative system 900 for utilizing seamless interspace traversing, in accordance with some embodiments of this disclosure. User equipment devices 903, 907, 908, 910 (e.g., which may correspond to one or more of computing device may be coupled to communication network 906). Communication network 906 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 906) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 906.

System 900 may comprise media content source 902, one or more servers 904, and one or more edge computing devices 916 (e.g., included as part of an edge computing system). In some embodiments, the immersive video application may be executed at one or more of control circuitry 911 of server 904 (and/or control circuitry of user equipment devices 903, 907, 908, 910 and/or control circuitry 918 of edge computing device 916). In some embodiments, data may be stored at database 905 maintained at or otherwise associated with server 904, and/or at storage 922 and/or at storage of one or more of user equipment devices 903, 907, 908, 910.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide data for seamless interspace traversing, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

Edge computing device 916 may comprise control circuitry 918, I/O path 920, and storage 922, which may be implemented in a similar manner as control circuitry 911, I/O path 912, and storage 924, respectively of server 904. Edge computing device 916 may be configured to be in communication with one or more of user equipment devices 903, 907, 908, 910 and server 904 over communication network 906, and may be configured to perform processing tasks (e.g., for seamless interspace traversing) in connection with ongoing processing of video data. In some embodiments, a plurality of edge computing devices 916 may be strategically located at various geographic locations, and may be mobile edge computing devices configured to provide processing support for mobile devices at various geographical regions.

FIG. 10A shows a flowchart of an illustrative process for seamless interspace traversing, in accordance with some embodiments of this disclosure. In various embodiments, the individual steps of process 1000 may be implemented by one or more components of the devices and systems of FIGS. 1-9. Although the present disclosure may describe certain steps of process 1000 (and of other processes described herein) as being implemented by certain components of the devices and systems of FIGS. 1-9, this is for purposes of illustration only, and it should be understood that other components of the devices and systems of FIGS. 1-9 may implement those steps instead. The system may have the following process steps:

At step 1002, an encoder (e.g., control circuitry 911 of FIG. 9 of a server 102 of FIG. 1) processes the inter-space pruning for cameras within intermediate space to reduce the overhead of additional camera bitstreams. For example, the encoder may determine the basic views and additional views of cameras in the intermediate space. Because each view has (x, y, z) vertex information, the views (images) can be moved to a same position. The encoder can find the differences, and remove from the additional view. This may reduce the overhead of additional camera bitstreams as information may be removed from each bitstream (e.g., size of bitstream may be reduced).

At step 1004, the encoder encodes pruned additional sub-group cameras and generates an additional sub-group bitstream for each intermediate space. In some embodiments, input/output circuitry (e.g., input/output circuitry 912 of FIG. 9) of a server 102 may transmit the additional sub-group bitstream for each intermediate space to a client device (e.g., client device 150 of FIG. 1).

At step 1006, the system (e.g., control circuitry of the server) detects user movement and position (controller, sensors, etc.) and decides next intermediate space (e.g., similar to handoff scenario in cellular networks).

At step 1008, the decoder (e.g., control circuitry of the client device) decodes the pre-encoded additional camera bitstream.

At step 1010, view synthesizer (e.g., control circuitry of the client device) generates virtual views using the decoded camera views (e.g., from step 1008) and views of cameras near the new space.

The step 1002 in the proposed system processing above, may reduce the bitrates of additional sub-group bitstream by pruning additional sub-group cameras with another camera view(s) at intermediate area in current space. In addition, the number of additional sub-group cameras may be determined according to the target bitrates for a client device in an XR streaming service.

FIG. 10B is a flowchart of a detailed illustrative process for prefetching intermediate view bitstreams, in accordance with some embodiments of this disclosure. In some embodiments, the system is MPEG DASH (Dynamic adaptive streaming over HTTP)-like client-driven streaming system. In various embodiments, the individual steps of process 1000 may be implemented by one or more components of the devices and systems of FIGS. 1-9. Although the present disclosure may describe certain steps of process 1000 (and of other processes described herein) as being implemented by certain components of the devices and systems of FIGS. 1-9, this is for purposes of illustration only, and it should be understood that other components of the devices and systems of FIGS. 1-9 may implement those steps instead.

At step 1022, the system (e.g., client device 105 of FIG. 1) starts the process. At step 1024, the system (e.g., input/output circuitry 912 of FIG. 9 of the client device) gets (e.g., receives) bitstreams for the current space. The system (e.g., input/output circuitry 912 of FIG. 9 of the client device) may receive a space coordination map. A space coordination map may be information that represents how an XR space is organized with multiple cameras. For example, a space coordination map may include camera coordination information. In some embodiments, the steps of process 1020 may be additionally or alternatively performed by a control circuitry (e.g., control circuitry 911, control circuitry 918, or control circuitry of any of devices 903, 907, 908, or 910).

At step 1026, the system (e.g., control circuitry 911 of FIG. 9 of the client device) determines if a subject is moving. If the system determines the subject is moving, the system continues to step 1028. If the system determines the subject is not moving, the system proceeds to step 1024. For example, a system may determine the subject is moving based on the received information from the current space. For example, the system may determine the subject is moving based on a pose of the subject. For example, the system may determine the subject is moving based on determining a velocity of the subject (e.g., being non-zero, being greater than a threshold value). For example, the system may determine a velocity vector of the subject by identifying the subject in a first subset of image data at a first time of the current space, identifying the subject in a second subset of image data of the current space at a second time after the first time. The system may determine a first and second location of the subject at a first and second time by computing a first and second center point of the subject in the first and second subset of the image data. The system may determine a velocity vector of the subject based on the first location, the second location, the first time, and the second time (e.g., dividing the change in position by the change in time).

At step 1028, the system (e.g., control circuitry of the client device) estimates a direction of the subject. For example, the client device may estimate the moving direction according to the space coordination map. The system may estimate the moving direction based on a pose of the subject or on a direction the subject is facing. The system may estimate the moving direction based on a determined velocity vector of the subject (e.g., direction of the vector based on change in position).

At step 1030, the system (e.g., control circuitry of the client device) checks (determines) whether there are one or more intermediate view bitstreams. For example, the client device may check with the server 102 of FIG. 1 whether there are intermediate view bitstreams available, or the client device may have a list of available bitstreams from the server 102 that it may check the availability of intermediate view bitstreams. If the system determines there are one or more intermediate view bitstreams, the system continues to step 1032. If the system determines there are no intermediate view bitstreams, the system proceeds to step 1024.

At step 1032, the system (e.g., control circuitry of the client device) prefetches the one or more intermediate view bitstreams. For example, the client device may request the server 102 to transmit an intermediate view bitstream. After step 1032, the system proceeds to step 1024. For example, the client device may receive the one or more intermediate view bitstreams as MPEG DASH system.

FIG. 11 show the steps for content preparation and seamless interspace traversing using intermediate view bitstreams. In some embodiments, the system prepares content for client devices. In various embodiments, the individual steps of process 1100 may be implemented by one or more components of the devices and systems of FIGS. 1-9. Although the present disclosure may describe certain steps of process 1100 (and of other processes described herein) as being implemented by certain components of the devices and systems of FIGS. 1-9, this is for purposes of illustration only, and it should be understood that other components of the devices and systems of FIGS. 1-9 may implement those steps instead.

At 1102, the system may encode bitstreams for spaces. In some embodiments, step 1102 (or any of the steps of process 1100) may be additionally or alternatively performed by a control circuitry (e.g., control circuitry 911, control circuitry 918, or control circuitry of any of devices 903, 907, 908, or 910). At 1104, the system may process inter-space pruning for cameras in intermediate space. At 1106, the system may generate additional camera bitstreams for intermediate spaces. In some embodiments, the system enables seamless interspace traversing. The system may receive camera coordinate information and subject movement information. At step 1112, the system may estimate a next intermediate space. For example, the system may estimate a next intermediate space based on subject movement information. The system may select cameras for a next intermediate space based on camera coordinate information. At step 1114, the system may prefetch and encode additional camera bitstream for next intermediate space. In some embodiments, input/output circuitry (e.g., input/output circuitry 912 of FIG. 9) may receive additional camera bitstream. At step 1116, the system (e.g., view synthesizer) may generate virtual views with camera views in the intermediate space.

Figure 12:
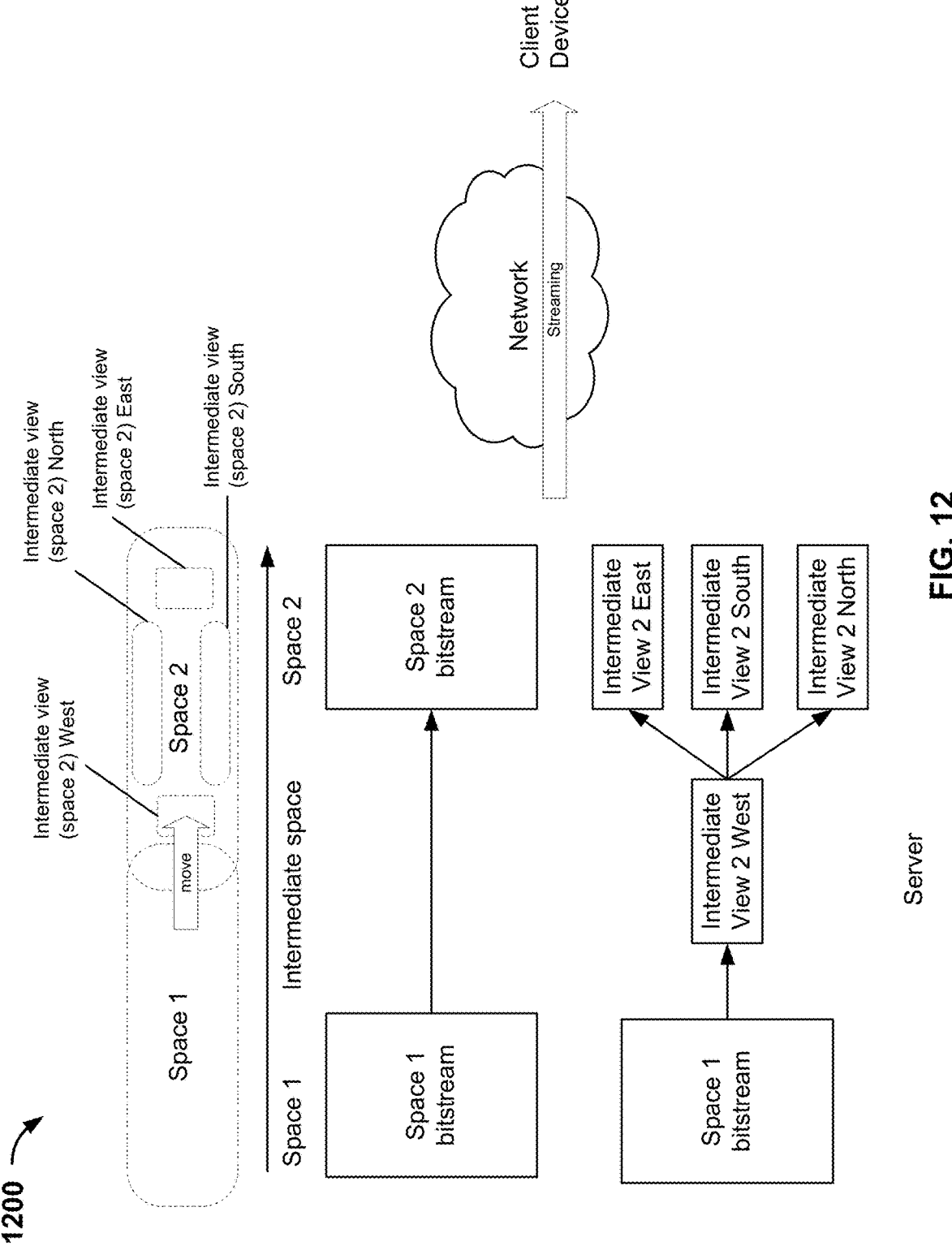
FIG. 12 is an illustrative example of streaming data from the server to the client according to intermediate view bitstreams, in accordance with some embodiments of this disclosure.

FIG. 12 is an illustrative example of streaming data from the server to the client according to intermediate view bitstreams, in accordance with some embodiments of this disclosure. In the example of FIG. 12, some sub-camera group bitstreams may be pre-encoded for providing low space traversing latency. According to the camera coordination, various type of MIV pre-encoding (pre-fetching) may be applied for the server and the client systems. For example, as a subject is initially in space 1, the system may encode space 1 bitstream (e.g., MIV bitstream) at the server and as the subject moves to space 2, the system may encode space 2 bitstream at the server. In some embodiments, as the subject moves from space 1 to space 2, the system may pre-encode bitstreams in the intermediate space. In some embodiments, the system may pre-encode cameras in an Intermediate View 2 (e.g., space 2) West. In some embodiments, the system may pre-encode cameras in an Intermediate View 2 (e.g., space 2) West, East, South, and/or North. In some embodiments, the system may pre-encode bitstreams from cameras in each intermediate view 2 triggered by when the subject moves from space 1 to space 2. For example, the system may first pre-encode bitstreams from cameras in an Intermediate View 2 West as a subject may be in an intermediate space encroaching on space 2. In some embodiments, the bitstreams from cameras in an Intermediate View 2 West may have higher quality (e.g., than other bitstreams in the intermediate space) and may have a low bitrate. As the subject moves further into space 2, the system may pre-encode bitstreams from cameras in Intermediate View 2 East, South, and North when the subject moves further into space 2. In some embodiments, the system may separately select and pre-encode bitstreams from sub-group cameras in space 2 in any suitable manner or order. The system (e.g., server) may send the encoded bitstreams to a client device over a network by streaming the bitstreams.

FIG. 13 is a flowchart of a detailed illustrative process for, in accordance with some embodiments of this disclosure. In various embodiments, the individual steps of process 1300 may be implemented by one or more components of the devices and systems of FIGS. 1-9. Although the present disclosure may describe certain steps of process 1300 (and of other processes described herein) as being implemented by certain components of the devices and systems of FIGS. 1-9, this is for purposes of illustration only, and it should be understood that other components of the devices and systems of FIGS. 1-9 may implement those steps instead.

At step 1302, input/output circuitry (e.g., input/output circuitry 912 of FIG. 9) connected to a control circuitry (e.g., control circuitry 911, control circuitry 918, or control circuitry of any of devices 903, 907, 908, or 910) receives first image data of respective views of an environment simultaneously captured by a first plurality of cameras associated with a first space of the environment.

At step 1304, input/output circuitry (e.g., input/output circuitry 912 of FIG. 9) connected to the control circuitry receives second image data of respective views of the environment simultaneously captured by a second plurality of cameras associated with a second space of the environment.

At step 1306, control circuitry detects, based on at least one of the first image data or the second image data, that a subject is located within the first space of the environment.

At step 1308, in response to detecting that the subject is located within the first space of the environment: control circuitry generates, for transmission at a first bitrate, a first bitstream based on at least a portion of the first image data; and control circuitry generates, for transmission at a second bitrate lower than the first bitrate, a second bitstream based on at least a portion of the second image data.

In some embodiments, the second space of the environment is adjacent to the first space. For example, the system may generate a lower bit-rate bitstream for any space that is adjacent to the current space. In some embodiments, the system may determine a direction of motion of the subject in the first space of the environment based on at least a portion of the first image data or the second image data, and the second space may be adjacent to the first space and in the direction of motion of the subject in the first space of the environment. For example, the system may generate lower bit-rate bitstreams from one or more spaces adjacent to the current space a subject is located in (e.g., current space a user may be viewing) and in the direction the subject is moving in (e.g., if subject is in space 1 and moving in a direction towards adjacent space 2, generating a lower-bitrate bitstream for space 2). The system may determine the direction of motion of the subject is based on a direction the subject is facing. The system may determine the direction of motion of the subject is based on a pose of the subject.

FIG. 14 is a flowchart of a detailed illustrative process for, in accordance with some embodiments of this disclosure. In various embodiments, the individual steps of process 1400 may be implemented by one or more components of the devices and systems of FIGS. 1-9. Although the present disclosure may describe certain steps of process 1400 (and of other processes described herein) as being implemented by certain components of the devices and systems of FIGS. 1-9, this is for purposes of illustration only, and it should be understood that other components of the devices and systems of FIGS. 1-9 may implement those steps instead.

At step 1402, input/output circuitry (e.g., input/output circuitry 912 of FIG. 9) connected to a control circuitry (e.g., control circuitry 911, control circuitry 918, or control circuitry of any of devices 903, 907, 908, or 910) receives third image data of respective views of the environment simultaneously captured by the second plurality of cameras associated with the second space of the environment.

At step 1404, input/output circuitry (e.g., input/output circuitry 912 of FIG. 9) connected to the control circuitry receives fourth image data of respective views of the environment simultaneously captured by the first plurality of cameras associated with the first space of the environment.

At step 1406, control circuitry detects, based on at least one of the third image data or the fourth image data, that the subject is located within the second space of the environment. At step 1408, in response to detecting that the subject is located within the second space of the environment: control circuitry generates, for transmission at a third bitrate, a third bitstream based on at least a portion of the third image data; and control circuitry generates, for transmission at a fourth bitrate lower than the third bitrate, a fourth bitstream based on at least a portion of the fourth image data. For example, if the system detects that a subject has moved from a first space to the second space, the system may generate a high-bitrate bitstream of views of the environment captured by the second cameras of the second space. The system may generate lower-bitrate bitstream of views of the environment captured by the first cameras of the first space, the first space being adjacent to the second space. The system may transmit the high-bitrate bitstream and the low-bitrate bitstreams to a client device.

In some embodiments, the system may receive third image data of respective views of the environment simultaneously captured by the second plurality of cameras associated with the second space of the environment. The system may receive fourth image data of respective views of the environment simultaneously captured by a third plurality of cameras associated with a third space of the environment, wherein the third space of the environment is adjacent to the second space of the environment. The system may detect, based on at least one of the third image data or the fourth image data, that the subject is located within the second space of the environment. In response to detecting that the subject is located within in the second space of the environment, the system may generate, for transmission at a third bitrate, a third bitstream based on at least a portion of the third image data, and the system may generate, for transmission at a fourth bitrate lower than the third bitrate, a fourth bitstream based on at least a portion of the fourth image data. For example, if the system detects that a subject has moved from a first space to the second space, the system may generate a high-bitrate bitstream of views of the environment captured by the second cameras of the second space. The system may generate lower-bitrate bitstream of views of the environment captured by third cameras of a third space that are adjacent to the second space. For example, the system may determine a subject is moving in the second space in a direction towards a third space, and generate the lower-bitrate bitstream of views of the environment captured by third cameras of the third space. The system may transmit the high-bitrate bitstream and the low-bitrate bitstream to a client device.

FIG. 15 is a flowchart of a detailed illustrative process for, in accordance with some embodiments of this disclosure. In various embodiments, the individual steps of process 1500 may be implemented by one or more components of the devices and systems of FIGS. 1-9. Although the present disclosure may describe certain steps of process 1500 (and of other processes described herein) as being implemented by certain components of the devices and systems of FIGS. 1-9, this is for purposes of illustration only, and it should be understood that other components of the devices and systems of FIGS. 1-9 may implement those steps instead.

At step 1502, input/output circuitry (e.g., input/output circuitry 912 of FIG. 9) connected to a control circuitry (e.g., control circuitry 911, control circuitry 918, or control circuitry of any of devices 903, 907, 908, or 910) receives image data of respective views of an environment simultaneously captured by a plurality of cameras. For example, an environment may have multiple spaces with multiple cameras associated with each space, and the system may receive image data from each camera in each space of an environment.

At step 1504, control circuitry estimates a location of a subject based on the image data. For example, the system may estimate the location of the subject by identifying in a subset of the image data the subject, of which multiple images were simultaneously captured by two or more of the plurality of cameras. The system may determine a direction of motion of the subject based on the subset of the image data. For example, the system may determine the direction of motion of the subject based on a direction the subject is facing or a pose of the subject. The system may determine the estimated location of the subject based on the direction of motion of the subject. In some embodiments, the system may identify the subject in a first subset of the image data at a first time and determine a first location of the subject by computing a first center point of the subject in the first subset of the image data. The system may identify the subject in a second subset of the image data at a second time after the first time and determine a second location of the subject by computing a second center point of the subject in the second subset of the image data. The system may determine a velocity vector of the subject based on the first location, the second location, the first time, and the second time. The system may multiply the velocity vector by a time period to determine the estimated location of the subject.

At step 1506, control circuitry selects a group of one or more cameras of the plurality of cameras based on the estimated location of the subject. For example, the image data of the respective views of each camera of the group of one or more cameras may include a portion of the environment at the estimated location of the subject. The system may select a group of one or more cameras (e.g., a selected sub-group of cameras) based on image data of the respective views of each camera including a portion of the environment at the estimated location of the subject.

At step 1508, control circuitry generates a bitstream based on additional image data of respective source views of the environment captured by the group of one or more cameras. In some embodiments, input/output circuitry connected to control circuitry transmits the generated bitstream to a client device.

FIG. 16 is a flowchart of a detailed illustrative process for, in accordance with some embodiments of this disclosure. In various embodiments, the individual steps of process 1600 may be implemented by one or more components of the devices and systems of FIGS. 1-9. Although the present disclosure may describe certain steps of process 1600 (and of other processes described herein) as being implemented by certain components of the devices and systems of FIGS. 1-9, this is for purposes of illustration only, and it should be understood that other components of the devices and systems of FIGS. 1-9 may implement those steps instead.

At step 1602, control circuitry (e.g., control circuitry 911, control circuitry 918, or control circuitry of any of devices 903, 907, 908, or 910) determines the subject is in a first space of the environment based on the image data, wherein a first group of cameras of the plurality of cameras is associated with the first space. For example, the system may determine an estimated location of the subject in the environment, and the system may determine the estimated location of the subject corresponds to a location associated with the first space of the environment.

At step 1604, control circuitry selects, based on the estimated location of the subject, a first sub-group of one or more cameras from the first group of cameras, wherein the selected group of one or more cameras comprises a second sub-group of one or more cameras from a second group of cameras of the plurality of cameras associated with a second space, wherein the second space is adjacent to the first space.

At step 1606, control circuitry removes redundant image data captured from the first sub-group of one or more cameras from the additional image data captured by the second sub-group of one or more cameras, wherein the generating the bitstream is based on the additional image data of the respective source views of the environment captured by the group of one or more cameras with the redundant image data removed. In some embodiments, at least one camera of the first sub-group and the second sub-group of one or more cameras is a 360-degree camera, and removing the redundant image data includes removing redundant image data from the 360-degree camera. For example, image data from a 360-degree camera may have high inter-view redundancy with other cameras in an intermediate space. The system may perform inter-space pruning to reduce the inter-view redundancies.

In some embodiments, step 1606 may be optional. For example, each of the cameras of the first sub-group and the second sub-group of one or more cameras may be a 2D perspective camera. With 2D perspective cameras, there may be low inter-view redundancies, and the system may skip inter-space pruning.

In some embodiments, the system may select based on the estimated location of the subject, a third sub-group of one or more cameras from a third group of cameras of the plurality of cameras associated with a third space, wherein the third space is adjacent to the first space. The system may remove redundant image data captured from the first and second sub-groups of one or more cameras from additional third image data captured by the third sub-group of one or more cameras to generate pruned third image data. The system may generate a second bitstream based on the pruned third image data.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving first omnidirectional image data of a first space of an environment;
   receiving second omnidirectional image data of a second space of the environment;
   generating, at an XR device, a XR environment comprising a first XR space corresponding to the first space of the environment and a second XR space corresponding to the second space of the environment;
   determining a current viewport direction within the XR environment for the XR device;
   based at least in part on the determining that the viewport direction within the XR environment corresponds primarily to the first XR space and secondarily to the second XR space:
      generating, for transmission at a first bitrate, a first bitstream based on at least a portion of the first omnidirectional image data corresponding to the first XR space; and
      generating, for transmission at a second bitrate lower than the first bitrate, a second bitstream based on at least a portion of the second omnidirectional image data corresponding to the second XR space.

2. The method of claim 1, wherein the second space of the environment is adjacent to the first space of the environment.

3. The method of claim 1, wherein an XR user accesses the XR environment via the XR device comprising at least one sensor, the method further comprising:
   determining a direction of motion of an XR user in the first XR space based on sensor data from the at least one sensor, wherein the second XR space is adjacent to the first XR space and in the direction of motion of the XR user in the first space.

4. The method of claim 3, wherein determining the direction of motion of the XR user in the first XR space is based on a direction the XR user is facing.

5. The method of claim 3, wherein determining the direction of motion of the XR user in the first XR space of the environment is based on a pose of the XR user.

6. The method of claim 1, further comprising:
   receiving third omnidirectional image data of the second space of the environment;
   receiving fourth omnidirectional image data of the first space of the environment;
   determining that the viewport direction within the XR environment corresponds to the second XR space; and
   based at least in part on the determining that the viewport direction within the XR environment corresponds to the second XR space:
      generating, for transmission at a third bitrate, a third bitstream based on at least a portion of the third omnidirectional image data; and
      generating, for transmission at a fourth bitrate lower than the third bitrate, a fourth bitstream based on at least a portion of the fourth omnidirectional image data.

7. The method of claim 1, further comprising:
   receiving third omnidirectional image data of the second space of the environment;
   receiving fourth omnidirectional image data of a third space of the environment, wherein the third space of the environment is adjacent to the second space of the environment;
   determining that the viewport direction within the XR environment corresponds to the second XR space; and
   based at least in part on the determining that the viewport direction within the XR environment corresponds to the second XR space;
      generating, for transmission at a third bitrate, a third bitstream based on at least a portion of the third omnidirectional image data; and
      generating, for transmission at a fourth bitrate lower than the third bitrate, a fourth bitstream based on at least a portion of the fourth omnidirectional image data.

8. A system comprising:
   input/output circuitry configured to:
      receive first omnidirectional image data of respective views of a first space of an environment; and
      receive second omnidirectional image data of a second space of the environment; and
   control circuitry configured to:
      generate, at an XR device, a XR environment comprising a first XR space corresponding to the first space of the environment and a second XR space corresponding to the second space of the environment;
      determine a current viewport direction within the XR environment for the XR device;
      based at least in part on the determining that the viewport direction within the XR environment corresponds primarily to the first XR space and secondarily to the second XR space:
         generate, for transmission at a first bitrate, a first bitstream based on at least a portion of the first omnidirectional image data corresponding to the first XR space; and
         generate, for transmission at a second bitrate lower than the first bitrate, a second bitstream based on at least a portion of the second omnidirectional image data corresponding to the second XR space.

9. The system of claim 8, wherein the second space of the environment is adjacent to the first space of the environment.

10. The system of claim 8, wherein an XR user accesses the XR environment via the XR device comprising at least one sensor, and wherein the control circuitry is further configured to:

determine a direction of motion of an XR user in the first XR space based on sensor data from the at least one sensor, wherein the second XR space is adjacent to the first XR space and in the direction of motion of the XR user in the first XR space.

11. The system of claim 10, wherein the control circuitry configured to determine the direction of motion of the XR user in the first XR space is configured to:

determine the direction of motion of the XR user in the first XR space based on a direction the XR user is facing.

12. The system of claim 10, wherein the control circuitry configured to determine the direction of motion of the XR user in the first XR space is configured to:

determine the direction of motion of the XR user in the first XR space based on a pose of the XR user.

13. The system of claim 8, wherein the input/output circuitry is further configured to:

receive third omnidirectional image data of the second space of the environment; and receive fourth omnidirectional image data of the first space of the environment; and wherein the control circuitry is further configured to:

determine that the viewport direction within the XR environment corresponds to the second XR space; and based at least in part on the determining that the viewport direction within the XR environment corresponds to the second XR space:

generate, for transmission at a third bitrate, a third bitstream based on at least a portion of the third omnidirectional image data; and generate, for transmission at a fourth bitrate lower than the third bitrate, a fourth bitstream based on at least a portion of the fourth omnidirectional image data.

14. The system of claim 8, wherein the input/output circuitry is further configured to:

receive third omnidirectional image data of respective views of the second space of the environment; and receive fourth omnidirectional image data of a third space of the environment, wherein the third space of the environment is adjacent to the second space of the environment; and wherein the control circuitry is further configured to:

determining that the viewport direction within the XR environment corresponds to the second XR space; and based at least in part on the determining that the viewport direction within the XR environment corresponds to the second XR space;

generate, for transmission at a third bitrate, a third bitstream based on at least a portion of the third omnidirectional image data; and generate, for transmission at a fourth bitrate lower than the third bitrate, a fourth bitstream based on at least a portion of the fourth omnidirectional image data.

15. A non-transitory computer-readable medium having instructions encoded thereon that when executed by control circuitry cause the control circuitry to:

receive first omnidirectional image data of a first space of an environment;

receive second omnidirectional image data of a second space of the environment;

generate, at an XR device, a XR environment comprising a first XR space corresponding to the first space of the environment and a second XR space corresponding to the second space of the environment;

determine a current viewport direction within the XR environment for the XR device;

based at least in part on the determining that the viewport direction within the XR environment for the XR device corresponds primarily to the first XR space and secondarily to the second XR space:

generate, for transmission at a first bitrate, a first bitstream based on at least a portion of the first omnidirectional image data corresponding to the first XR space; and generate, for transmission at a second bitrate lower than the first bitrate, a second bitstream based on at least a portion of the second omnidirectional image data corresponding to the second XR space.

16. The non-transitory computer-readable medium of claim 15, wherein the second space of the environment is adjacent to the first space of the environment.

17. The non-transitory computer-readable medium of claim 15, wherein an XR user accesses the XR environment via the XR device comprising at least one sensor, and wherein the instructions cause the control circuitry to further:

determine a direction of motion of an XR user in the first XR space based on sensor data from the at least one sensor, wherein the second XR space is adjacent to the first XR space and in the direction of motion of the XR user in the first XR space.

18. The non-transitory computer-readable medium of claim 17, wherein the instructions cause the control circuitry to determine the direction of motion of the XR user in the first XR space by:

determining the direction of motion of the XR user in the first XR space based on a direction the XR user is facing.

19. The non-transitory computer-readable medium of claim 17, wherein the instructions cause the control circuitry to determine the direction of motion of the XR user in the first XR space by:

determining the direction of motion of the XR user in the first XR space based on a pose of the XR user.

20. The non-transitory computer-readable medium of claim 15, wherein the instructions cause the control circuitry to further:

receive omnidirectional third image data of the second space of the environment; and receive fourth omnidirectional image data of the first space of the environment; and wherein the control circuitry is further configured to:

determine that the viewport direction within the XR environment corresponds to the second XR space; and based at least in part on the determining that the viewport direction within the XR environment corresponds to the second XR space:

generate, for transmission at a third bitrate, a third bitstream based on at least a portion of the third image data; and generate, for transmission at a fourth bitrate lower than the third bitrate, a fourth bitstream based on at least a portion of the fourth omnidirectional image data.

* * * * *